(12) United States Patent
Mark

(10) Patent No.: US 12,035,693 B2
(45) Date of Patent: *Jul. 16, 2024

(54) BROILER PAN FEEDER

(71) Applicant: CTB, Inc., Milford, IN (US)

(72) Inventor: Wayne R. Mark, Elkhart, IN (US)

(73) Assignee: CTB, Inc., Milford, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,661

(22) Filed: Oct. 27, 2022

(65) Prior Publication Data

US 2023/0043074 A1    Feb. 9, 2023

Related U.S. Application Data

(63) Continuation of application No. 17/060,452, filed on Oct. 1, 2020, now abandoned, which is a continuation of application No. 15/921,475, filed on Mar. 14, 2018, now Pat. No. 10,827,728.

(60) Provisional application No. 62/471,357, filed on Mar. 14, 2017.

(51) Int. Cl.
*A01K 39/012* (2006.01)
*A01K 39/01* (2006.01)

(52) U.S. Cl.
CPC ...... *A01K 39/0125* (2013.01); *A01K 39/0113* (2013.01); *A01K 39/012* (2013.01)

(58) Field of Classification Search
CPC . A01K 39/012; A01K 39/0113; A01K 39/014

USPC .......................... 119/53, 56.1, 61.5
See application file for complete search history.

(56) References Cited

U.S. PATENT DOCUMENTS

| | | | | |
|---|---|---|---|---|
| 5,007,380 A | * | 4/1991 | Badia ................. | A01K 39/0125 119/57.4 |
| 5,113,797 A | * | 5/1992 | van Daele .......... | A01K 39/0125 119/57.4 |
| 5,765,503 A | * | 6/1998 | van Daele .......... | A01K 39/0125 119/57.4 |
| 5,875,733 A | * | 3/1999 | Chen .................. | A01K 39/0125 119/57.4 |
| 6,655,317 B1 | * | 12/2003 | Steudler, Jr. ....... | A01K 39/0125 119/57.4 |
| 7,552,697 B2 | * | 6/2009 | Busse .................... | A01K 39/01 119/57.7 |
| 7,647,888 B2 | * | 1/2010 | Slankard ............ | A01K 39/0125 119/53 |

* cited by examiner

*Primary Examiner* — David J Parsley
(74) *Attorney, Agent, or Firm* — Clark Hill PLC

(57) ABSTRACT

An adjustable feeder pan system for feeding poultry and a related method is provided. The feeder pan system includes a cone portion, an excluder portion that includes a number of anti-rake and radially disposed fins, a skirt, a feed pan, a cap, and optionally a feed shut-off component. The cone includes a pair of stops that may selectively engage with one of a number of pairs of corresponding slots of varying depths on the excluder portion so as to provide multiple feed levels as desired and depending upon the size and age of the poultry being fed.

20 Claims, 28 Drawing Sheets

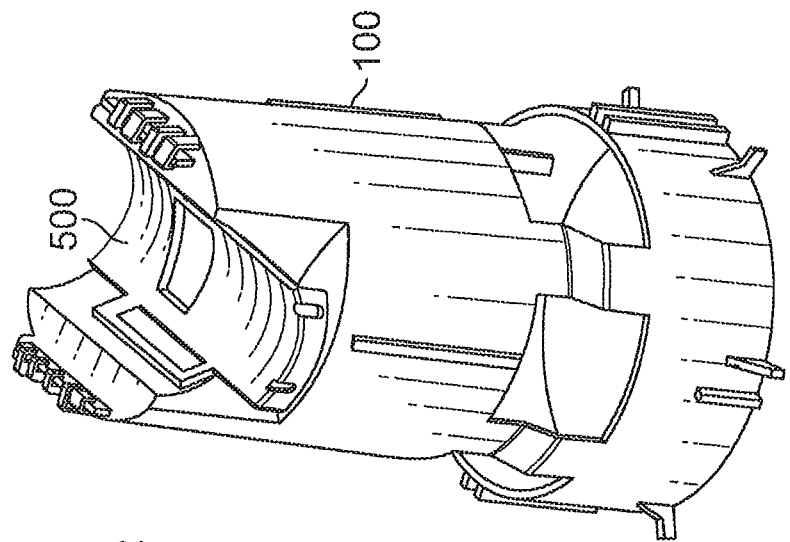
FIG. 35
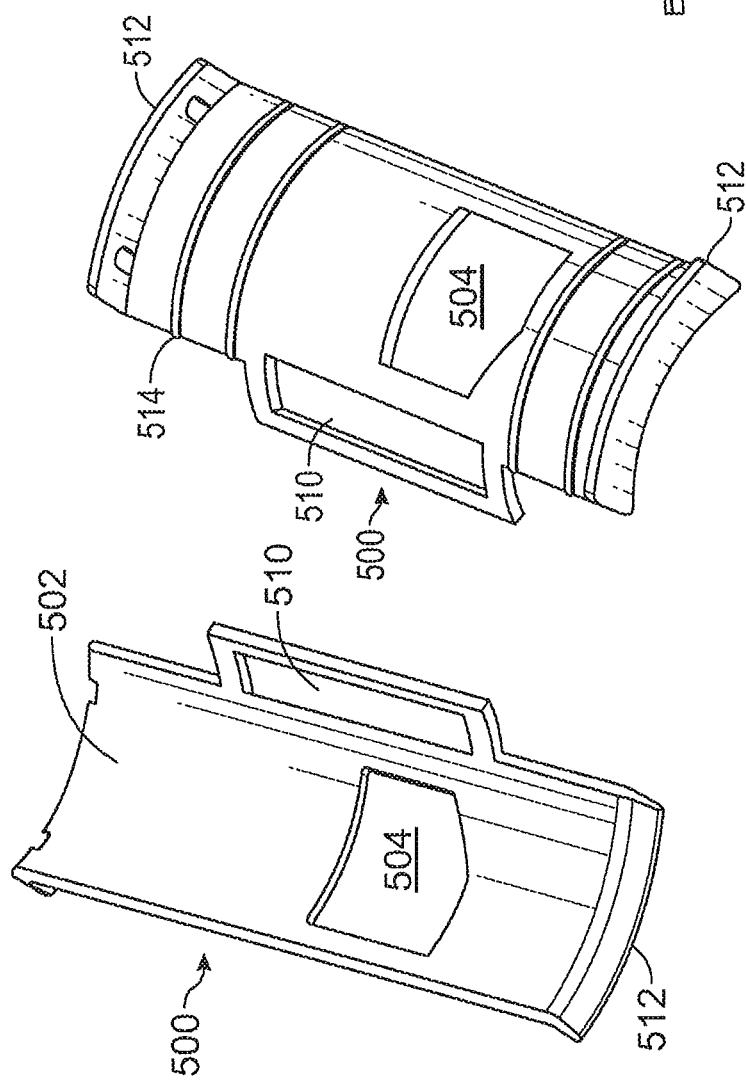
FIG. 34
FIG. 33

BROILER PAN FEEDER

CROSS REFERENCE TO RELATED APPLICATIONS

This continuation application claims the benefit of U.S. Nonprovisional patent application Ser. No. 15/921,475 filed on Mar. 14, 2018, which claims priority to, and the benefit of, U.S. Provisional Patent Application Ser. No. 62/471,357 filed on Mar. 14, 2017

FIELD OF THE INVENTION

The invention generally relates to the field of feeder systems for feeding livestock. More particularly, the invention relates to a feeder pan device to be used in conjunction with poultry feeder systems

BACKGROUND OF THE INVENTION

Automated feeding systems for poultry and like domestic animals have proven to be highly successful in modern animal husbandry operations These systems can supply feed mixtures to a large poultry flock with minimum effort by the poultry grower Both the amounts of feed delivered and the proportions of feed ingredients can be regulated, thus permitting the flock to be inexpensively raised from chicks to mature, commercially valuable birds in a relatively short time Among the important parts of such automated feeding systems are the feeder assemblies. These assemblies receive feed flow from a feed conveyor, and are located on or near the poultry house floor to afford the birds ready access to the feed Early poultry growers traditionally introduced very young birds into poultry houses and provided supplemental feed to the young birds or chicks on paper, cardboard or the like, which was laid on the poultry house floor. The chicks were not initially introduced to feeding from feeder assemblies for two main reasons One reason was that chicks were unable to gain access to the feed in the feeder assemblies because the height of the feeder assemblies from where the birds would gain access to the feed was too high for the chicks Another reason was that the feed which was introduced into the feeder assembly was always provided on the bottom of a pan of the feeder assembly such that even if the young birds could reach over the height of the side of the feeder assembly, the birds could not then reach down to eat the feed at the bottom of the feeder assembly Thus, the poultry grower provided supplemental feed to the chicks either by providing the supplemental feed to the chicks outside of the feeder assemblies or by hand filling the supplemental feed into the feeder assemblies to provide a high feed level.

Problems, however, arose with such practice Among these problems, obviously, was that such a practice required more time and labor by the poultry grower which could be better utilized elsewhere Also, the feed provided on the floor of the poultry house came into contact with waste, dirt, etc, which the birds would also then eat, potentially causing health problems for the birds Further, the birds raked the feed with their feet such that the feed became spread out over the poultry house floor, such that a fair amount of the feed placed on the floor by the poultry grower was wasted Thus, many prior art feeders were designed to help combat these problems For instance, the feeder assemblies disclosed in U.S. Pat. Nos. 5,311,839, 5,462,017 and 5,718,187 attempted to solve the problem of the height of the feeder assemblies being too high such that smaller birds could not gain access to or see the feed presented in the feeder assembly to eat it, thus requiring the poultry growers to either utilize the supplemental feed, as discussed above or provide separate feeder assemblies in which the smaller birds would be able to feed from These feeder assemblies utilized a lost motion connection between the grill and the pan to provide both a shallow pan depth for younger, smaller birds and a deep pan depth for older, larger birds The problem with the lost motion connection for the poultry grower is that in order to utilize the lost motion connection, the feeder assemblies had to be raised off of or lowered onto the poultry house floor For instance, the feeder assemblies could not be lowered from the deep pan depth to the shallow pan depth without a bottom of the pan resting on the poultry house floor As the floors of poultry houses are often uneven, the feeder assemblies could not all be consistently configured in the same manner when the feeder assemblies were positioned on the floor of the poultry house Other designs like the feeder assemblies disclosed in U.S. Pat. Nos. 4,476,811 and 5,092,274 also attempted to solve the problem of the feed being presented to younger, smaller birds at too low of a level within the feeder assemblies The feeder assemblies provided both an upper or "brood" feed gate to provide high feed levels for younger, smaller birds and a lower feed gate to provide lower feed levels for older, larger birds The upper feed gate was provided as a window in the feed drop tube of the feeder assembly, which, when open, would allow feed to flow therethrough to create a high feed level in the feeder assembly for the young birds to easily see and eat. When the birds grew older and larger, the poultry grower could close the upper feed gate and allow the feed to flow through the bottom of the feed drop tube, i e, the lower feed gate, to provide a lower feed level.

These feeder assemblies, while highly successful in industry, do, however, have some disadvantages For example, in these inventions, the upper and lower feed gates are typically not both able to be open if the poultry grower should so desire them to be Also, the feed gates are typically only opened and closed by moving the feeder assemblies on and off of the ground Finally, these feeder assemblies did not provide for a smooth transition from a high feed level to a low feed level, as a practical matter the poultry grower could only provide a high feed level or a low feed level, but nothing in between Feeder assemblies of the prior art have also caused other problems for the poultry grower. For example, when birds grow larger, the birds typically like to eat from the feeder assemblies by resting a front side of their bodies on or against the feeder assembly in some manner As feeder assemblies of the prior art have not typically been designed with the comfort and health of the birds in mind, the birds tend to eat from the feeder assemblies while being uncomfortable In many prior art feeder assemblies, when birds rest on or against the feeder assemblies, detrimental physical effects, such as bruising, blistering, irritation, etc, to the front sides of the bird's bodies, such as their breasts, may occur Such detrimental physical effects can cause two major problems One is that since the front sides of the birds' bodies will become detrimentally physically affected, the birds will not be comfortable resting on or against the feeder assemblies, such that the birds may not eat as much food from the feeder assemblies as it is too uncomfortable for them to do so Thus, the birds either do not become as large and are not as commercially valuable as they could have been, or the rate at which the birds grow is reduced, thus taking longer for them to reach their optimal size and weight Secondly, once the birds are defeathered and graded, if the front sides of bird's bodies are detrimentally physically affected, the birds will receive a lower grade, thus making them less commercially valuable Therefore, an improved feeder assembly is needed which will overcome the problems and disadvantages of prior art feeder assemblies. The present invention provides such a feeder assembly Features and advantages of the present invention will become apparent upon a reading of the attached specification, in combination with a study of the drawings.

While preferred embodiments of the present invention are shown and described, it is envisioned that those skilled in the art may devise various modifications of the present invention without departing from the spirit and scope of the invention SUMMARY OF THE INVENTION A preferred embodiment of the present invention comprises An adjustable feed level pan feeder assembly comprising
  a) a feed pan having a substantially centrally disposed upstanding conical member,
  b) an excluder releasably attached to said feed pan, said excluder comprising a plurality of radially disposed fins, said excluder further comprising a scalloped peripheral edge, said excluder also comprising a flood control member having a diameter less than the diameter of said scalloped peripheral edge, said fins being disposed substantially equidistantly and each of said fins extending from a top surface of said flood control member and to said scalloped peripheral edge of said excluder thereby defining a plurality of feed chambers each bounded by at least two fins and an arcuate wall segment of said scalloped peripheral edge, at least a portion of said fins having a curved upper edge, said excluder further comprising a cone receiving portion for receiving a cone member, said cone receiving portion having a downwardly disposed annular lip having a plurality of pairs of oppositely disposed notches, each of said pairs of notches having different depths;
  c) said cone member comprising an upper cone segment and a lower cone segment, said upper and lower cone segments being connected by a plurality of struts, said cone member further comprising a plurality of circumferentially disposed flood windows disposed between said upper and lower cone segments; said cone member further comprising a pair of oppositely disposed stop tabs, said flood windows being selectively substantially opened or selectively substantially closed by the sliding of the feed cone towards or away from the feed pan as desired; said stop tabs being configured for the selective engagement with one of said pairs of notches on said excluder upon rotational engagement of said cone with said excluder such that varying feed level heights are achieved as desired depending on the depth of the pair of notches being engaged with the pair of stop tabs; and
  d) a skirt, said skirt extending peripherally from said lower cone segment and comprising downwardly extending sloped walls that extend radially and downwardly from said lower cone segment

ELEMENT LIST 10 feeder assembly, 100 cone; 102 cone upper segment; 104 cone lower segment; 106 struts, 108 strut upper portion, 110 strut middle portion, 112 strut lower portion, 114 rail, 116 flood window, 118 stop tab, 120 feed tube receiving recess, 122 upstanding cap receiving projection, 124 outer section of projection; 126 top section of projection, 128 inner section of projection, 130 skirt supporting extensions; 200 feed pan; 202 upstanding conical member 204 conical member top surface, 206 annular wall of feed pan, 208 cone receiving portion, 210 circumferential sloped area of pan, 212 feed receiving area of pan, 214 rimmed wall of pan, 216 outwardly extending pan tabs, 218 apertures for receiving excluder tabs, 220 hole for receiving lock; 222 first area of excluder tab aperture, 224 second area of excluder tab aperture, 226 inner circumferential rim for seating excluder, 300 skirt, 302 cone receiving opening, 304 downwardly extending sloped walls of skirt, 305 annular peripheral wall, 306 top surface, 308 lower surface, 400 excluder; 402 fins, 404 scalloped peripheral edge; 406 flood control member, 408 feed chambers, 410 curved upper edge of fin, 412 cone receiving portion, 414 downwardly extending annular lip; 416 notches, 418 grooves of cone receiving portion, 420 annular wall of cone receiving portion, 422 cone receiving opening, 424 locking tabs, 426 first section of locking tab, 428 second section of locking tab, 430 third section of locking tab, 432 fin extension, 434 fin extension support, 436 locking projection; 438 locking projection aperture; 440 arcuate wall segment of scalloped peripheral edge, 442 feed level indicia, 444 locking key; 500 feed shut-off component, 502 curved top surface; 504 feed flow aperture, 506 feed tube, 507 feed dispensing opening, 508 feed tube tab, 510 slot for receiving feed tube tab, 512 downwardly extending end portions, 514 transverse ribs, 516 open position, 518 half open position, 520 closed position, 600 cap; 602 top surface, 604 bottom surface; 606 longitudinal groove, 608 projections, 610 longitudinal stop, 612 first end of stop, 614 second end of stop; 616 upstanding portion, 700 alternate cap

BRIEF DESCRIPTION OF THE DRAWINGS

FIG. 33 is a top perspective view of the feed shut-off component of the pan feeder assembly of the present invention, FIG. 34 is a bottom perspective view of the feed shut-off component of the pan feeder assembly of the present invention;

FIG. 35 is a side perspective view showing the feed shut-off component installed in the cone component of the pan feeder assembly of the present invention.

DETAILED DESCRIPTION OF THE INVENTION

With reference to the figures and elements referenced herein, an improved pan feeder assembly is provided It should be appreciated that the embodiments described and shown herein are exemplary in nature only and that various additional embodiments are contemplated and within the scope of the present invention.

Figure 1:
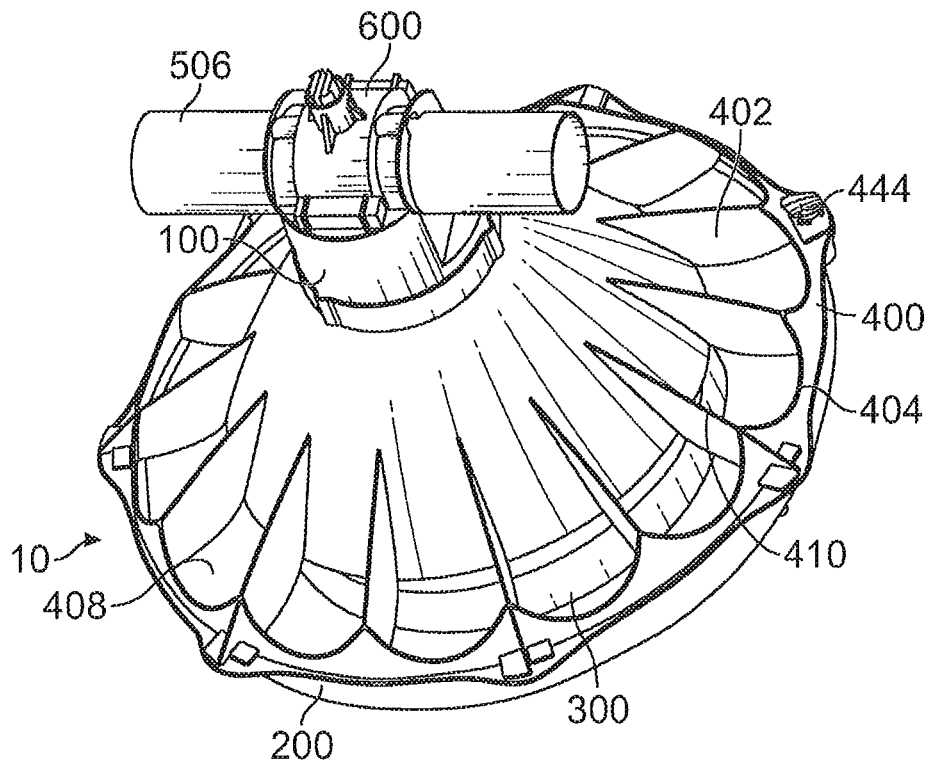
FIG. 1 shows a top perspective view of the pan feeder assembly of the present invention.
Figure 2:
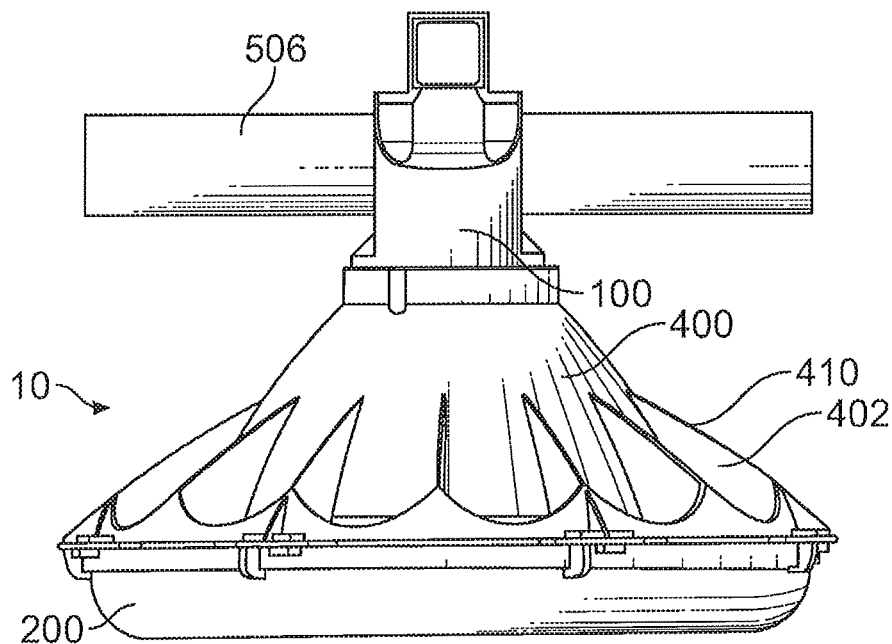
FIG. 2 shows a side elevational view of the pan feeder assembly of the present invention.

Although a single pan feeder of the present invention is shown and described herein, it should be appreciated that the feeder system of the present invention is adapted for use with known prior art husbandry feed distribution systems—particularly for feed distribution systems for poultry where rearing houses that use feed distribution systems with a plurality of feed supply conduits or tubes for distributing feed as desired to a number of feeders in predetermined locations throughout the rearing house As best shown in FIGS. 1 and 2, an improved broiler pan feeder assembly 10 is provided As will be described in greater detail herein, the pan feeder 10 of the present invention is generally comprised of the following components. a cone member 100, a feed pan 200, a skirt member 300, a chick excluder or excluder member 400 and preferably a cap member 600. The pan feeder 10 is in communication with a feed tube 506 (section shown) in order to selectively receive and distribute feed as desired throughout the feed pan 200 as will be described in greater detail herein The various components are preferably comprised of heavy duty and durable polypropylene plastic materials, though other materials may be used as are known in the industry As best shown in FIGS. 5-7 and 21, one component of the pan feeder 10 of the present invention is a cone member or cone 100. Although referred to as a "cone", it should be appreciated that the cone 100 of the present invention is not truly of a geometric conical shape, but rather has the general tapered configuration of a cone and is preferably of the preferred configuration and construction as shown and described herein The cone member 100 is generally comprised of an upper cone segment 102 and a lower cone segment 104 The upper cone segment 102 and lower cone segment 104 are connected together and separated by a number of vertically disposed struts 106 As can be seen in the figures, between the struts 106, the lower edge of the upper cone segment 102, and the upper edge of the lower cone segment 104 are a number of circumferentially disposed flood windows 116

The significance of which will be described in detail herein, the cone 100 also comprises a pair of oppositely disposed stop tabs 118 preferably disposed on the outer surface of the lower cone segment 104 The struts 106 of the cone 100 are each preferably comprised of an upper portion 108 that extends downwardly and outwardly from the upper cone segment 102 The struts 106 also each preferably include a middle portion 110 that extends in a sloped fashion downwardly and outwardly from the upper strut portion 108 Further, the struts 106 also each preferably include a lower strut portion 112 that extends downwardly from the bottom edge of the middle strut portion 110 to the top edge of the lower cone segment 104

Figure 5:
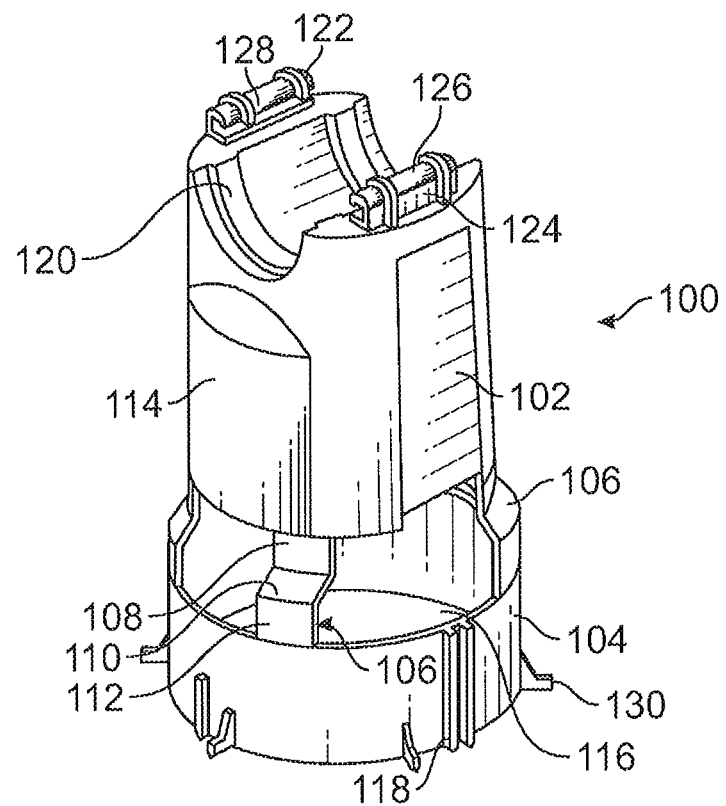
FIG. 5 is a perspective view of the cone component of the pan feeder assembly of the present invention.
Figure 6:
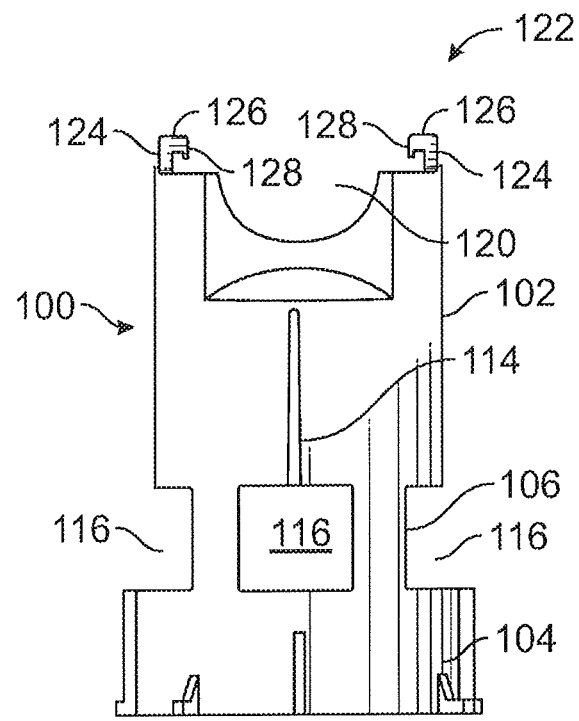
FIG. 6 is a side elevational view of the cone component of the pan feeder assembly of the present invention.
Figure 7:
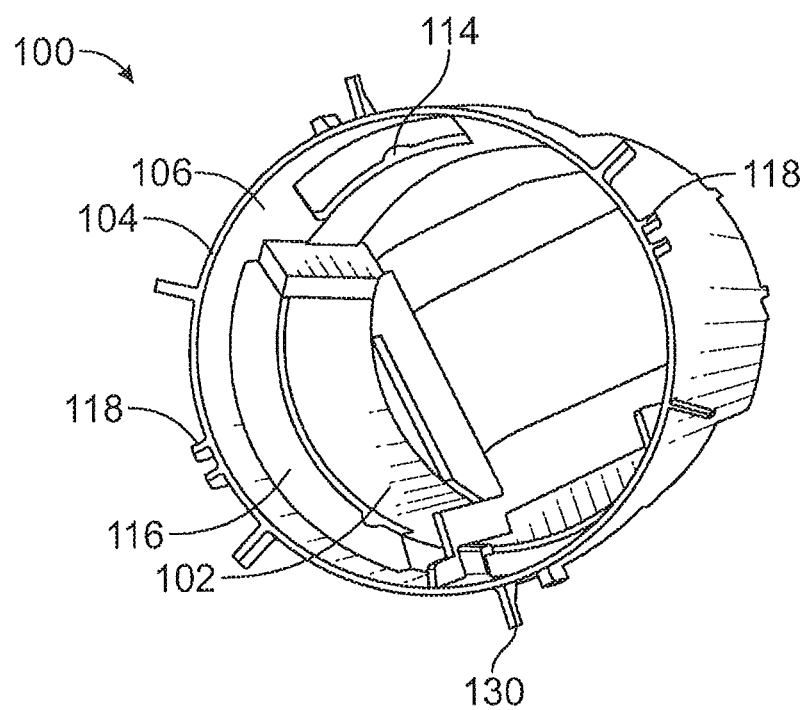
FIG. 7 is a bottom perspective view of the cone component of the pan feeder assembly of the present invention.
Figure 30:
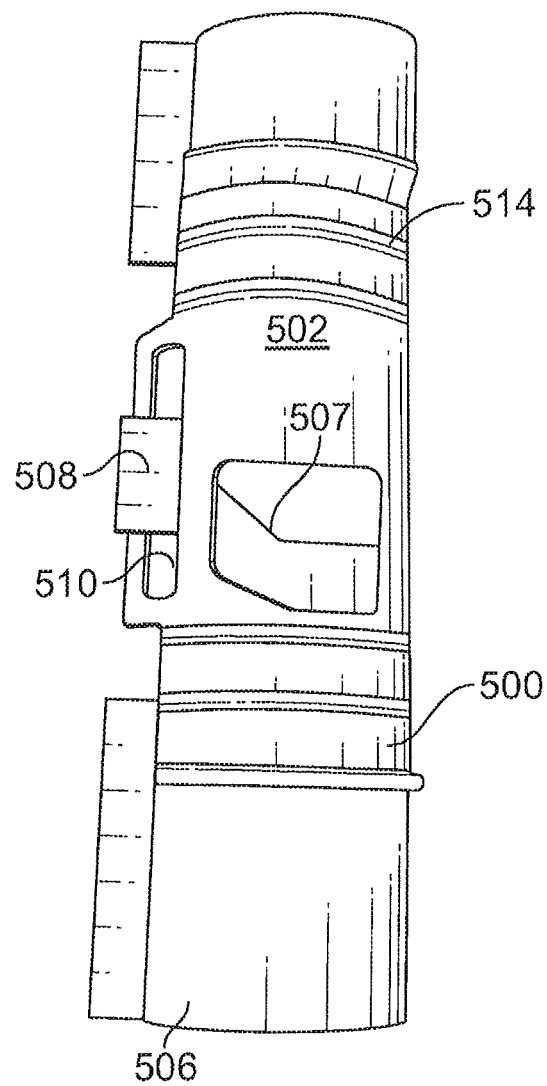
FIG. 30 is a top perspective view showing the feed shut-off component of the pan feeder assembly of the present invention being attached to a portion of a feed tube.
Figure 31:
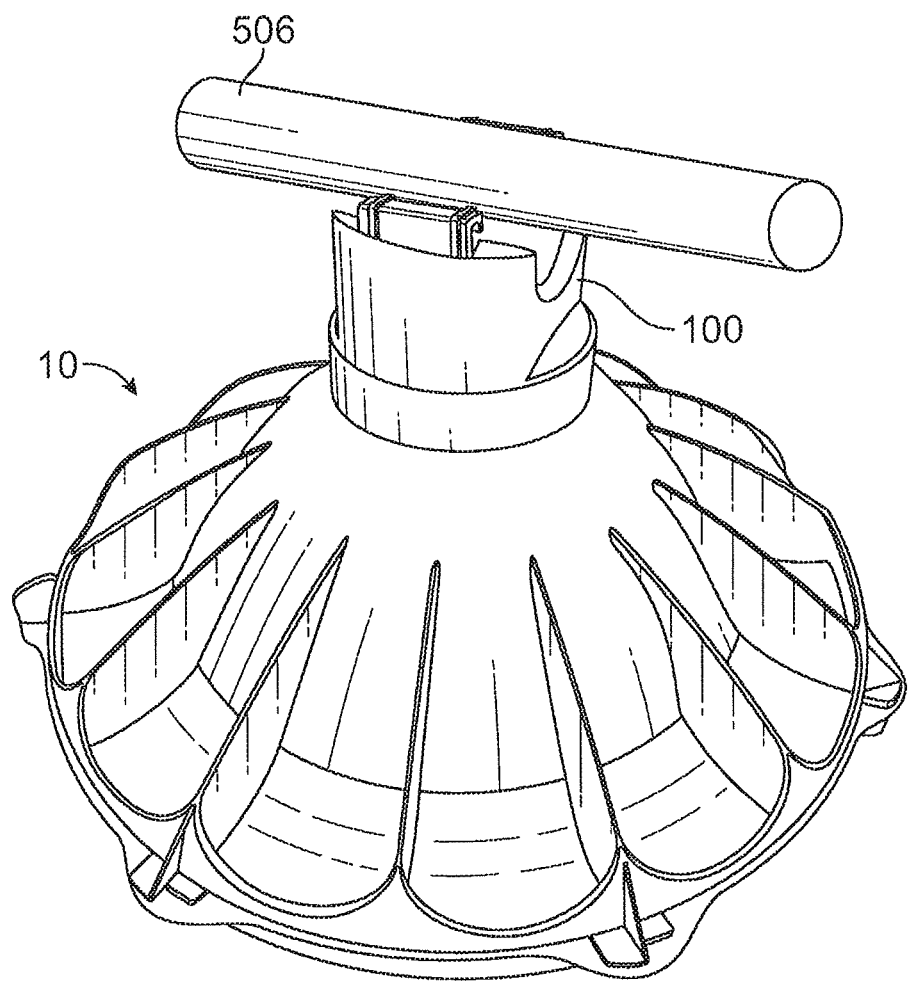
FIG. 31 is a side perspective view showing the pan feeder assembly of the present invention with optional feed shut-off component and feed tube being received within the cone portion.

The upper cone segment 102 also preferably has one or more substantially vertically disposed rails disposed on its outer surface Further, and as best shown in FIG. 6, the upper cone segment 102 also preferably includes a feed tube receiving recess 120 of substantially semicircular cross-section designed to accommodate a similarly sized feeding tube 506 (see FIGS. 30-32) Preferably, for the embodiment of the feeder system 10 in which the skirt 300 (see FIG. 8) is not integral with the cone 100 but is rather a separate piece, the lower cone segment 104 also preferably includes one or more peripherally disposed skirt supporting extensions 130 on its outer surface In addition, the upper cone segment 102, as best seen in FIGS. 5-6, also preferably includes at least one and more preferably includes two upstanding cap receiving projections 122 Preferably, the two upstanding cap receiving projections 122 are disposed on opposite sides of the feed tube receiving recess 120 of the upper cone segment 102

With reference to FIG. 6, each cap receiving projection 122 preferably includes an outermost section 124 that extends upwardly from the top of the upper cone segment 102 adjacent one side of the feed tube receiving recess 120 Each cap receiving projection 122 also preferably includes a top section 126 that extends inwardly from and substantially perpendicularly with the outer section 124 Also, each cap receiving projection 122 preferably includes an innermost section 128 that extends downwardly from and substantially perpendicularly with the top section 126

Figure 8:
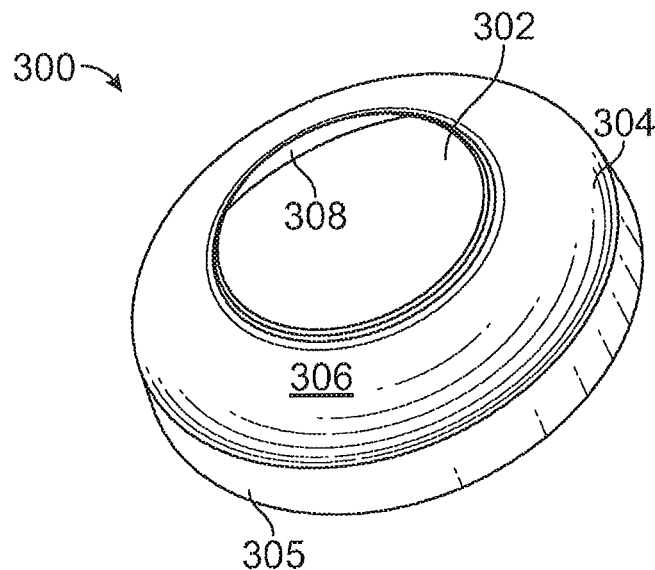
FIG. 8 is a perspective view of one embodiment of the skirt component of the pan feeder assembly of the present invention.
Figure 28:
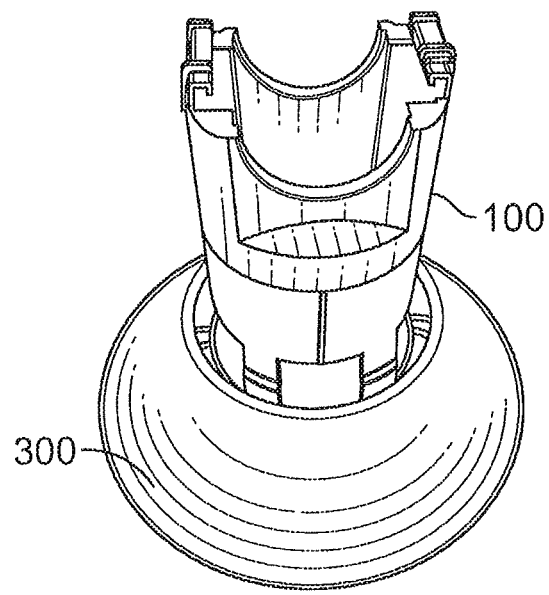
FIG. 28 is a top perspective view showing an alternate embodiment of the skirt component being installed about the cone portion of the pan feeder assembly of the present invention.

Having described the cone 100 in detail, another important component of the feeder assembly 10 of the present invention is the skirt component 300 With reference to FIG. 8, the skirt 300 preferably includes, an opening 302 for slidably receiving the cone 100 The skirt 300 preferably also includes downwardly extending sloped walls 304 on its top surface 306 that extend radially and downwardly from the lower cone segment 104 when the skirt 300 has been installed on the cone 100 by sliding the cone 100 upwardly through the cone receiving opening 302 on the underside of the skirt 300 until the lower surface 308 of the skirt 300 engages with and is supported by the skirt supporting extensions 130 In an alternate embodiment, the skirt 300 may be formed integrally with the cone 100 and not be a separate component As shown in FIG. 8, in one embodiment of the skirt 300, the skirt 300 may have an annular peripheral wall 305 that extends downwardly from the outermost periphery of the downwardly extending sloped walls 304 of the skirt 300 In an alternate embodiment of the skirt 300, and as best shown in FIG. 28, the skirt 300 may lack such an annular peripheral wall 305 and instead the downwardly extending sloped walls 304 continue to the outer periphery of the skirt 300 itself As best shown in FIGS. 9-14, another important component of the feeder pan assembly 10 of the present invention is the chick excluder component or excluder 400 The excluder 400 includes a number of radially disposed fins 402 These anti-rake fins 402 discourage birds from stepping in the pan 200 and also discourage them from scratching the feed out of the pan 200 thus minimizing contamination Preferably, the fins 402 also include a curved upper edge 410 The excluder also includes a flood control member 406 that is preferably roughly partially conical in configuration The excluder 400 also includes a scalloped peripheral edge 404 The largest diameter of the flood control member 406 is preferably less than that of the scalloped peripheral edge 404 Preferably the fins 402 are disposed substantially equidistantly from each other The fins 402 extend from the top surface of the flood control member 406 radially and outwardly to and connect with the innermost side of the scalloped peripheral edge 404 of the excluder 400

A plurality of feed chambers 408 are thus defined by and are each bounded by two of the fins 402 and an arcuate wall segment 440 of said scalloped peripheral edge 404 Each arcuate wall segment 440 connects two adjacent fins 402. Each arcuate wall segment 440 has an arcuate top edge having a height that extends 1) from a relatively high point where it connects with one fin 402, 2) then curves arcuately and downwardly to its midpoint having a relatively low height, and then 3) upwardly and arcuately to the same relative high point where it connects with a second adjacent fin 402

Figure 9:
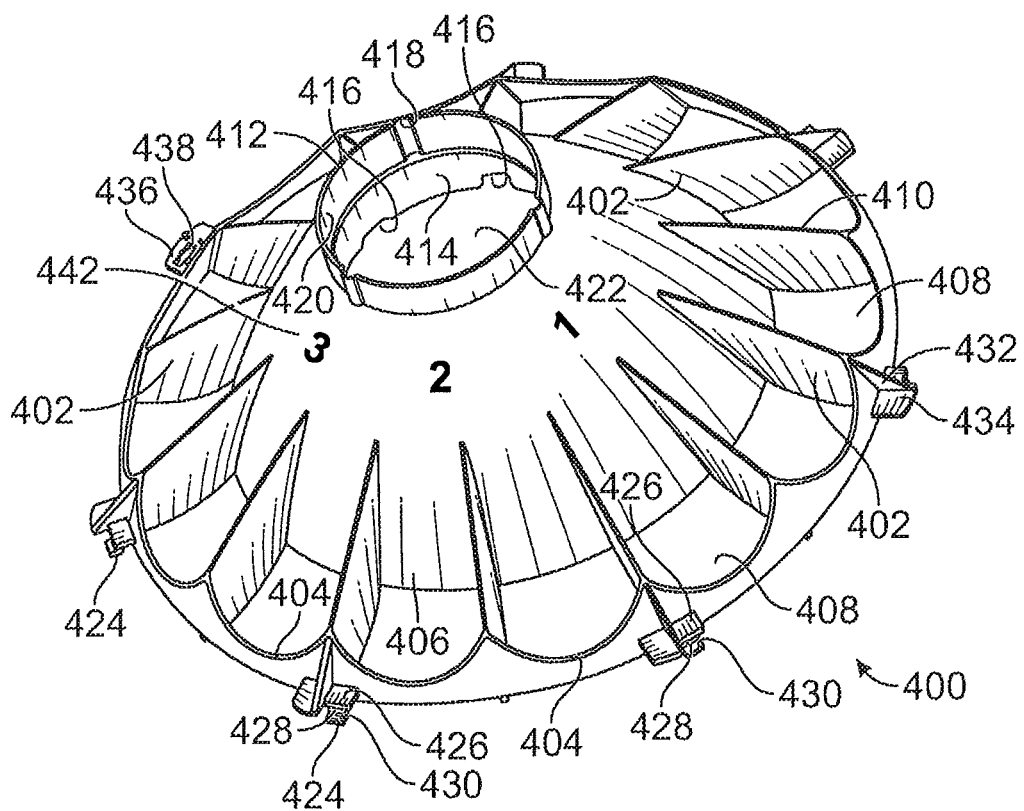
FIG. 9 is a top perspective view of the excluder component of the pan feeder assembly of the present invention.
Figure 10:
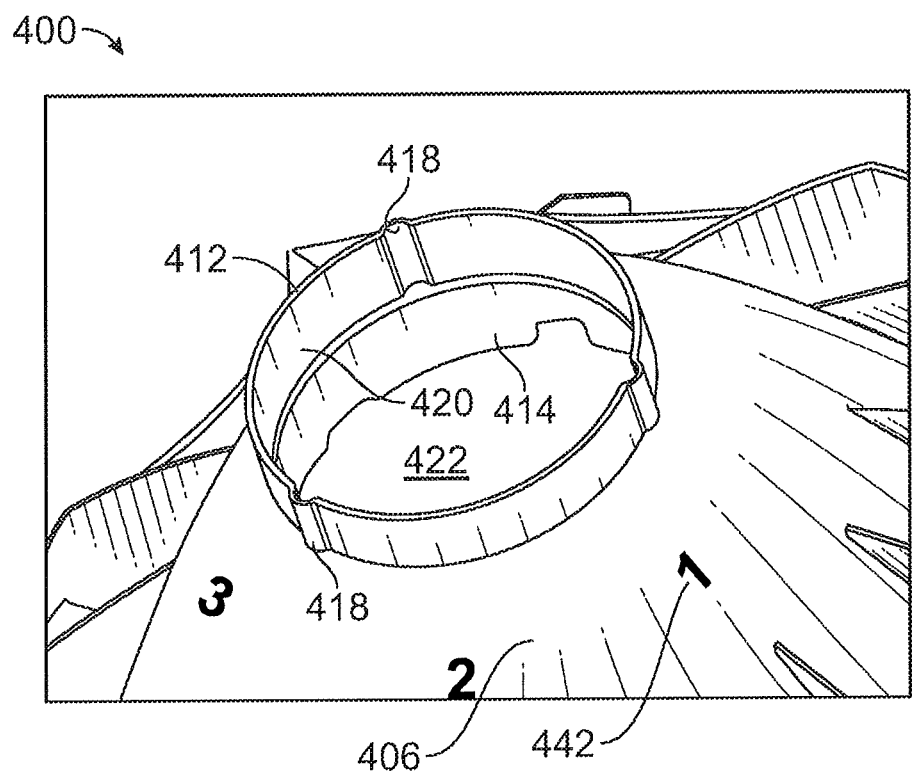
FIG. 10 is a partially cutaway view of a segment of the excluder component of the pan feeder assembly of the present invention showing the area where the cone component is inserted.
Figure 11:
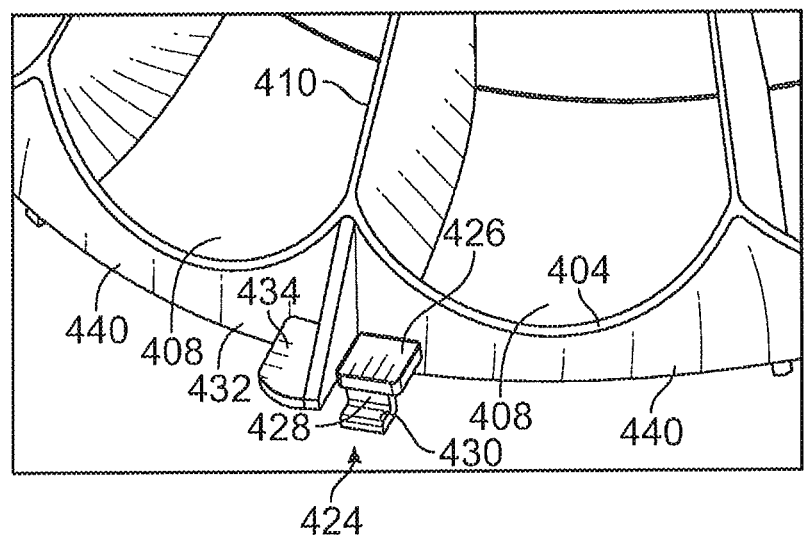
FIG. 11 is a partially cutaway view of a segment of the excluder component of the pan feeder assembly of the present invention showing in detail one of the locking tabs.
Figure 12:
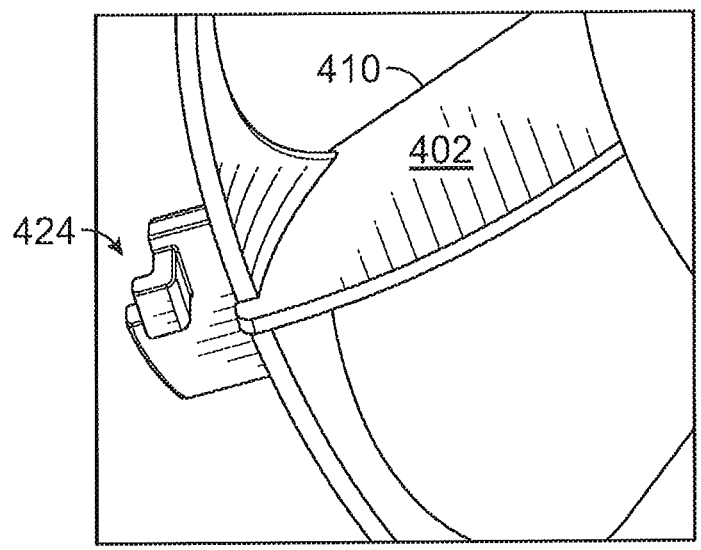
FIG. 12 is a partially cutaway bottom view of a segment of the excluder component of the pan feeder assembly of the present invention showing one of the locking tabs and underside of one of the fins.
Figure 14:
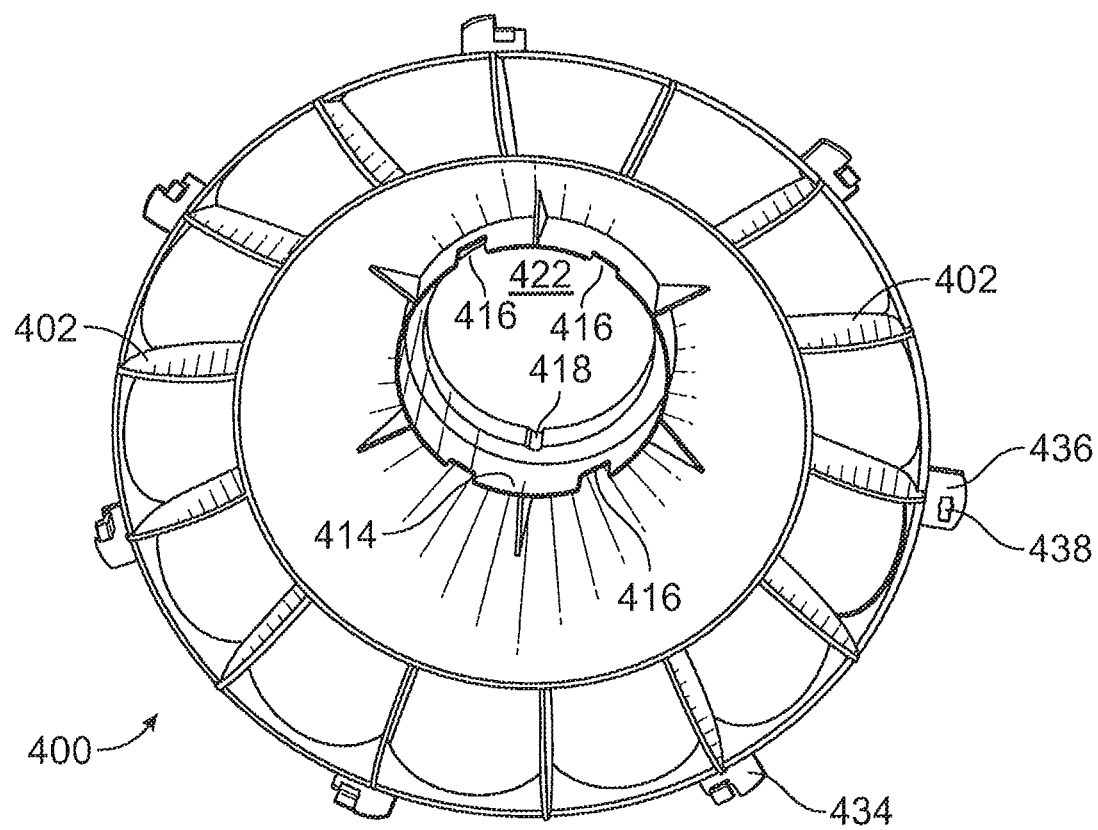
FIG. 14 is a bottom perspective view of the excluder component of the pan feeder assembly of the present invention showing the notches that allow for adjustability of feed height.
Figure 20:
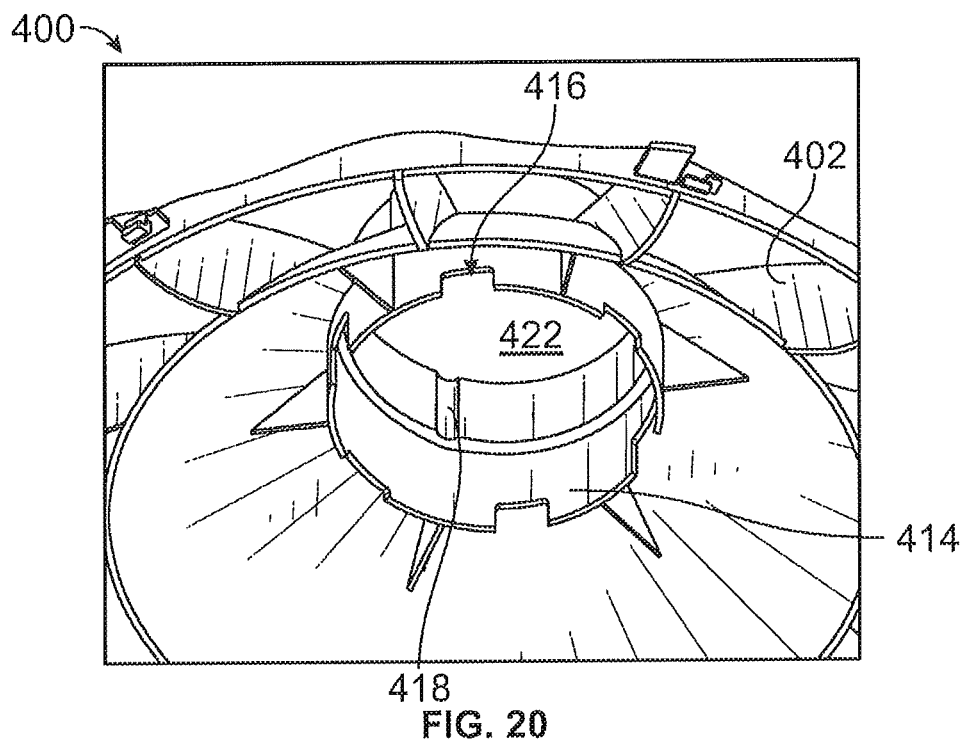
FIG. 20 is a partially cutaway bottom view of a segment of the excluder component of the pan feeder assembly of the present invention showing in detail the opposed pairs of notches that enable feed height adjustability.
Figure 21:
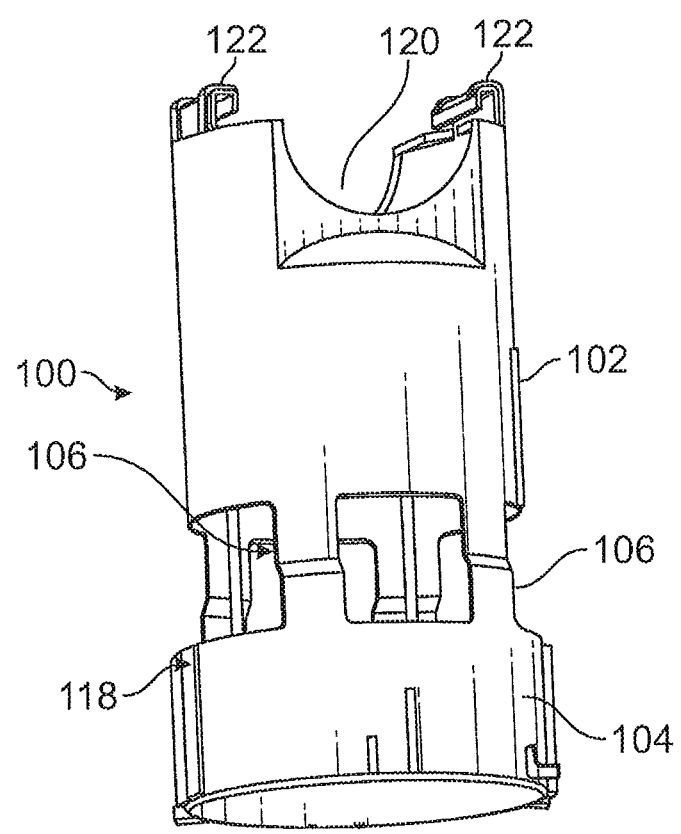
FIG. 21 is side perspective view of the cone component of the pan feeder assembly of the present invention.

Depending on the number of feed chambers 408 desired, the excluder 400 could include any number of fins 402 Preferably, the excluder 400 includes between about 8 and about 20 fins. More preferably the excluder 400 includes 14 fins resulting in 14 feed chambers 408 as shown in the figures The excluder 400 also includes a cone receiving portion 412 as best shown in FIGS. 9 and 10 As best shown in FIGS. 9, 14 and 20, the excluder 400 includes a downwardly disposed annular lip 414 that extends from the inner surface of the flood control member 406 The downwardly disposed annular lip 414 further includes a number of pairs of oppositely disposed notches 416 Preferably, each pair of oppositely disposed notches 416 are of the same depth, but have a different depth than the other pairs of oppositely disposed notches 416 More preferably, there are three pairs of oppositely disposed notches 416. As will be shown in greater detail herein, the stop tabs 118 of the cone 100 may be selectively engaged with one of the pairs of oppositely disposed notches 416 on the excluder 400 upon rotational engagement of the cone 100 with the excluder 400 such that varying feed level heights are achieved as desired depending on the depth of the notches 416 being engaged with the pair of stop tabs 118 Feed level numbering or indicia 442 may be provided on the top surface of the flood control member 406 to assist a user with selecting the appropriate feed level as desired As best shown in FIGS. 9 and 10, the cone receiving portion 412 preferably extends also generally upwardly from the flood control member 406 of the excluder 400 Preferably, the cone receiving portion 412 of the excluder 400 also has an upwardly extending annular wall 420 that has one or more vertical grooves 418 that are each adapted to slidably receive one of the vertically disposed rails 114 of the upper cone component 102 of the cone 100. The annular wall 420 and the downwardly extending annular lip 414 of the excluder 400 also define a cone receiving opening 422 such that the cone 100 with the skirt 300 installed thereon may be may be slid upwardly from the underside of the excluder 400 through the cone receiving opening 422. When installing the cone 100 and skirt 300 onto the excluder 400, the cone 100 is preferably selectively rotated such that the vertically disposed rails 114 of the cone 100 align with and slide upwardly into the vertical grooves 418 of the excluder (see also FIG. 29)

According to an important aspect of the present invention, and as best shown in FIGS. 9, 11, 12 and 14, the scalloped peripheral edge 404 of the excluder 400 preferably includes a number of locking tabs 424 that extend outwardly therefrom As will be shown and described herein in greater detail, the locking tabs 424 facilitate the connection of the excluder 400 to the feed pan 200 (see FIG. 15) Although any number of locking tabs 424 may be used, preferably there are about half as many locking tabs 424 as there are feed chambers 408 as shown in the figures Each locking tab 424 preferably includes a first section 426 that extends outwardly and substantially perpendicularly from the scalloped peripheral edge 404 of the excluder 400 Preferably, each locking tab 424 also includes a second section 428 that extends downwardly and substantially perpendicularly from the first section 426 of the locking tab 424 Further, each locking tab 424 also preferably includes a third section 430 that extends outwardly and substantially perpendicularly from the second section 428 of the locking tab 424

As best seen in FIG. 9, each locking tab 424 of the excluder 400 is preferably substantially aligned with and outboard of a corresponding fin 402 and is on the outer and opposite side of the fin 402 on the outer surface of an arcuate wall segment 440 from where the corresponding fin 402 connects with the inner surface of that arcuate wall segment 440

Each locking tab 424 of the excluder 400 preferably also comprises a fin extension 432 that corresponds with and is longitudinally aligned with a corresponding fin 402 disposed on the opposite side of the arcuate wall segment 440 from the corresponding locking tab 424 Preferably, as shown in the figures, the fin extensions 432 substantially continue with the curvature of their corresponding fins 402 More preferably, and to add greater structural stability to the locking tabs 424, each locking tab 424 may also include a fin extension support segment 434

Figure 13:
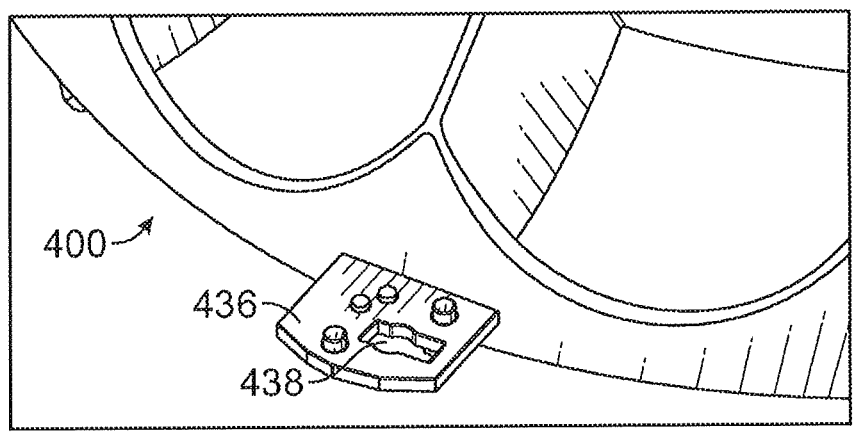
FIG. 13 is a partially cutaway top view of a segment of the excluder component of the pan feeder assembly of the present invention showing the locking projection and aperture for receiving the locking key.
Figure 17:
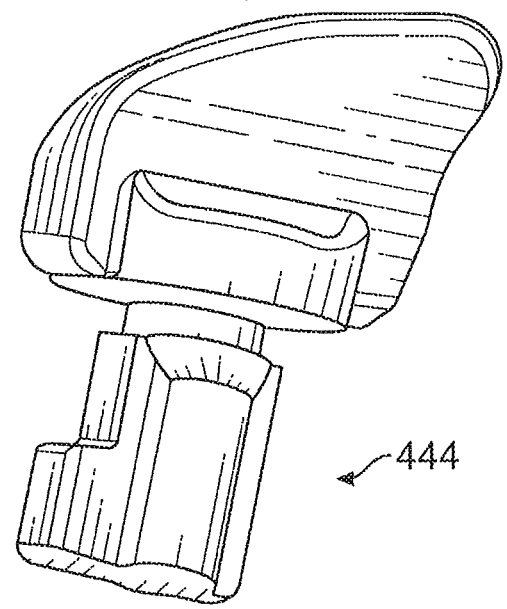
FIG. 17 shows one embodiment of the locking key component of the pan feeder assembly of the present invention.

As best shown in FIGS. 9, 13 and 14, the scalloped peripheral edge 404 of the excluder 400 further preferably includes at least one (and more preferably just one) outwardly extending locking projection 436 having a locking projection aperture 438 disposed therethrough. The locking projection aperture 438, as will be shown in greater detail herein, is designed to receive a locking key 444 as exemplarily shown in FIG. 17.

Figure 15:
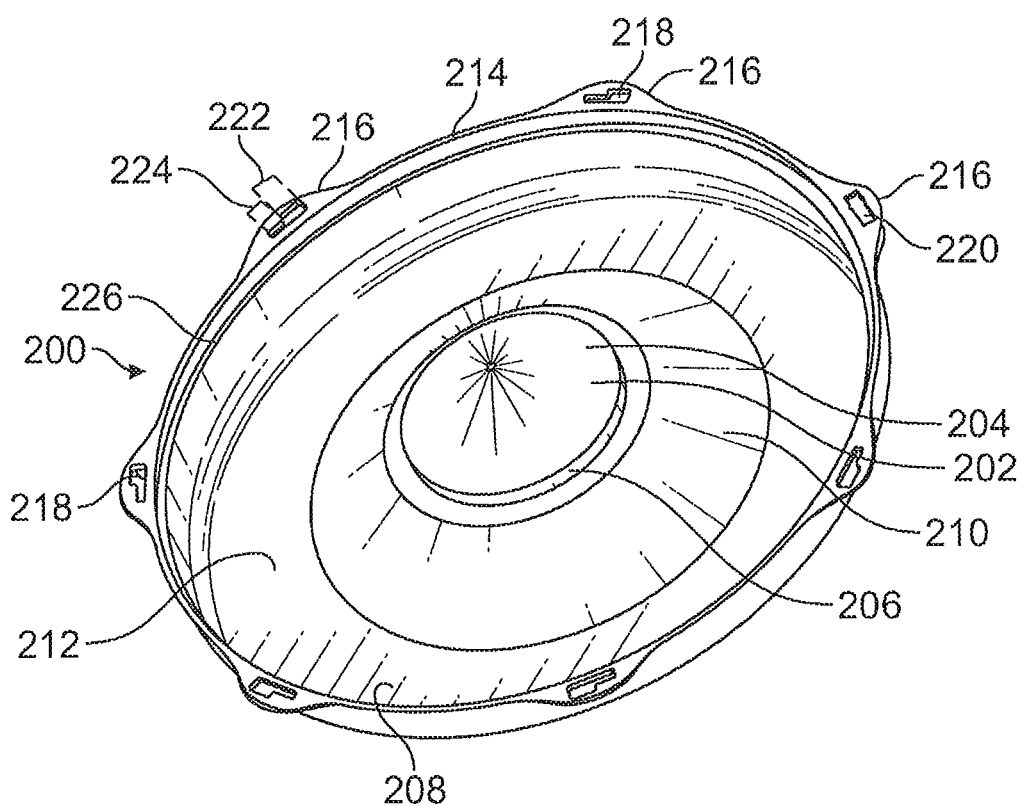
FIG. 15 is a top perspective view of the feed pan component of the pan feeder assembly of the present invention.
Figure 16:
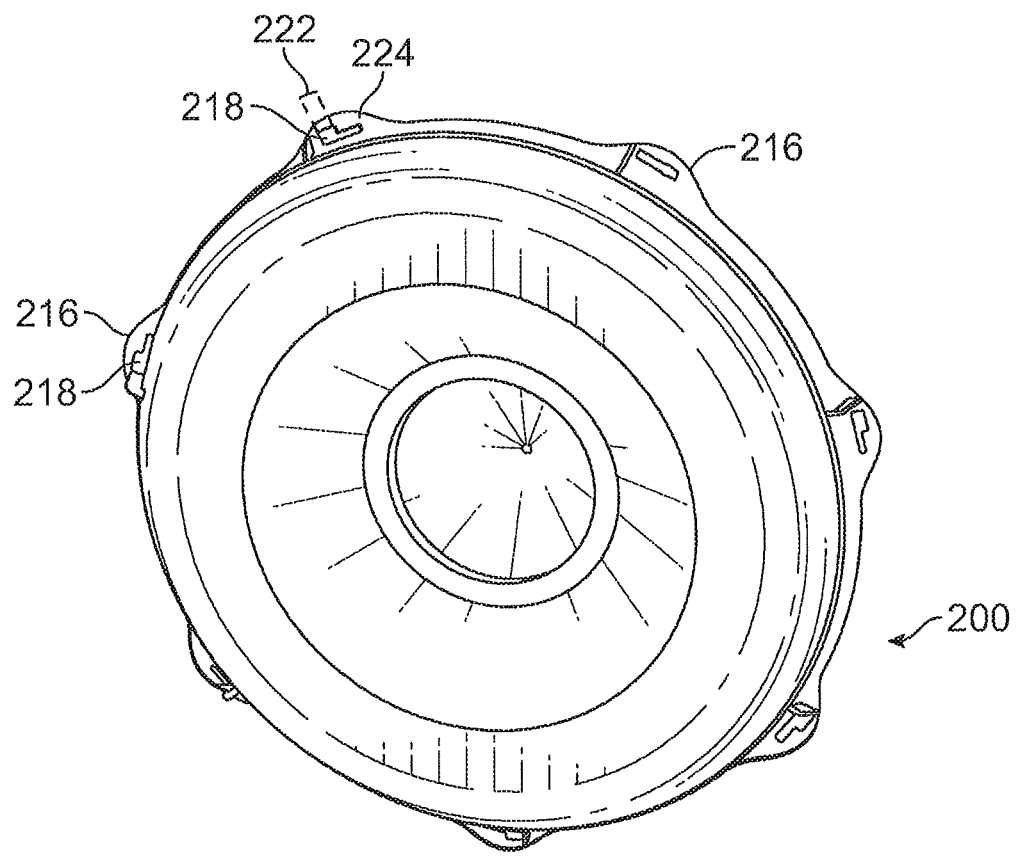
FIG. 16 is a bottom perspective view of the feed pan component of the pan feeder assembly of the present invention.

As shown most clearly in FIGS. 15 and 16, another component of the pan feeder assembly 10 of the present invention is the feed pan 200 itself The feed pan 200 includes a centrally disposed upstanding conical member 202 on its top surface. The conical member 202 has a central apex with sloped walls on its top surface 204 that radially extend downwardly from the apex Preferably, the feed pan 200 further preferably includes an annular wall 206 disposed under and that has a diameter substantially the same as the bottom of the upstanding conical member 202

The feed pan 200 also preferably includes an annular cone receiving portion or surface 208 that extends outwardly from and being substantially perpendicularly with the annular wall 206 This cone receiving surface 208 can selectively support and is configured to support the bottom peripheral edge of the lower cone segment 104 of the cone member 100 Preferably, the feed pan 200 also includes a circumferential sloped area 210 and a feed receiving area 212. Specifically, the circumferential sloped area 210 extends radially and downwardly from the cone receiving surface 208 to the feed receiving area 212 of the feed pan 200

Figure 18:
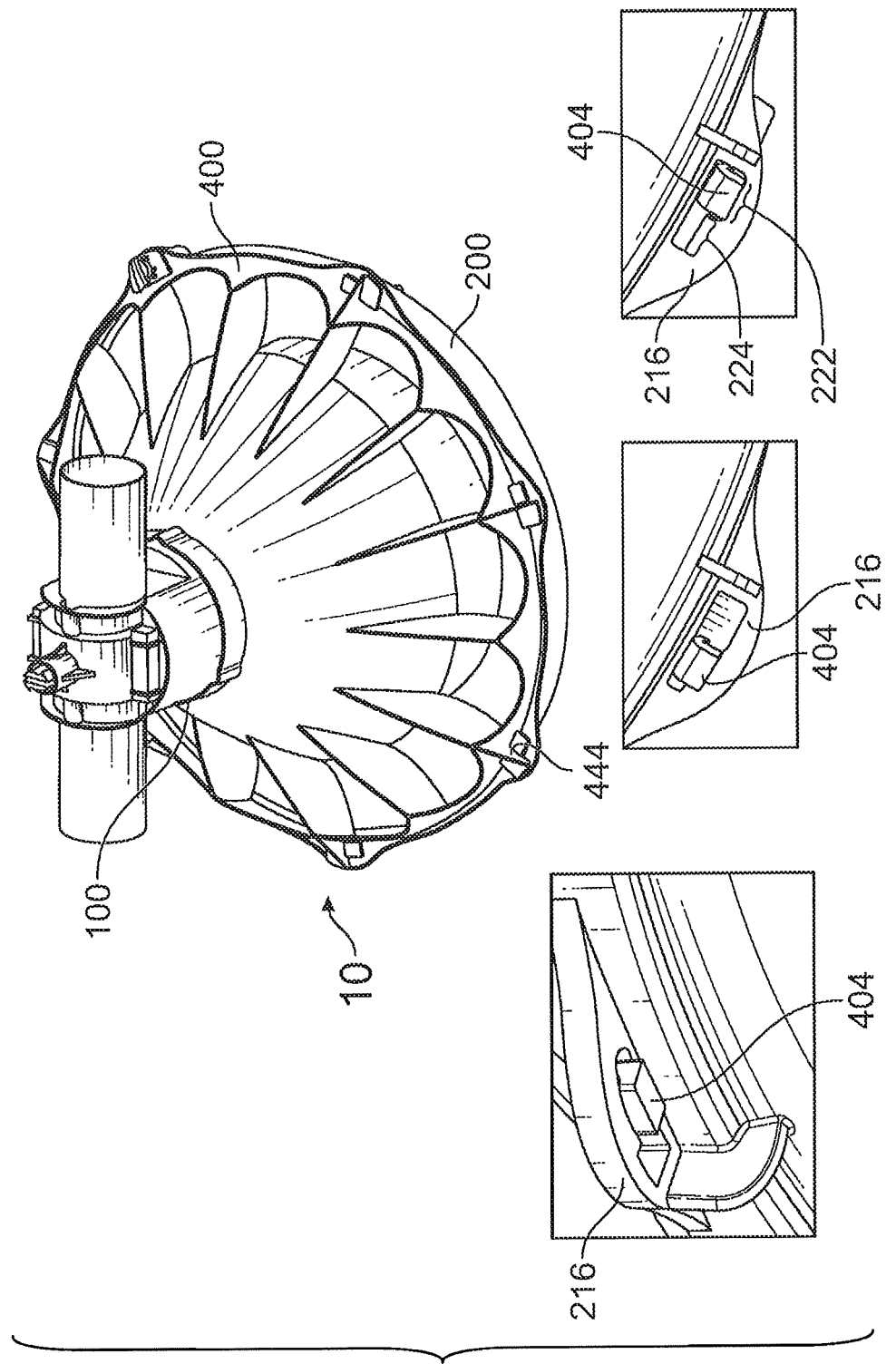
FIG. 18 is a series of views showing the insertion and subsequent sliding into position of one of the locking tabs of the excluder into a corresponding apertures on the feed pan component of the pan feeder assembly of the present invention.

Preferably, the feed pan 200 also includes a rimmed wall 214 that extends circumferentially and upwardly from the feed receiving area 212 of the pan 200 More preferably, the rimmed wall 214 also includes a number of outwardly extending tabs 216 extending outwardly and perpendicularly therefrom. As best shown in FIGS. 15, 16 and 18, at least some of the outwardly extending feed pan tabs 216 include an aperture 218 for receiving a corresponding locking tab 424 of the excluder 400.

Figure 29:
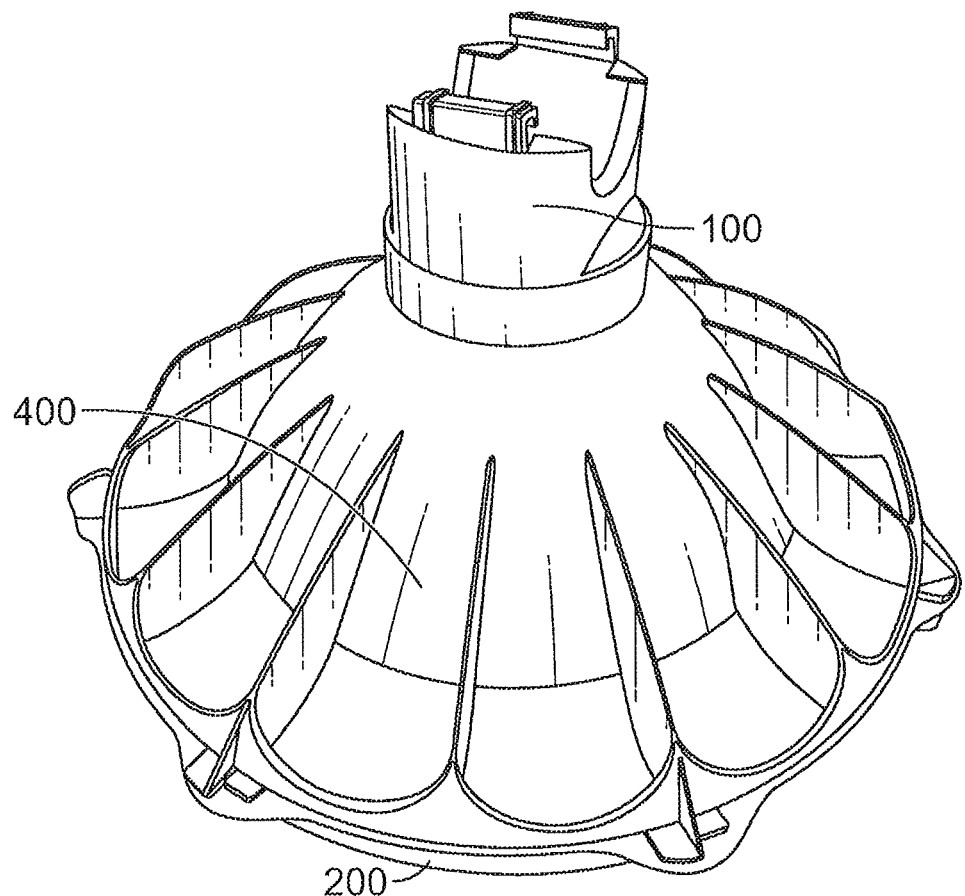
FIG. 29 is a top perspective view showing steps to install and connect the cone, skirt, excluder and feed pan portions of the pan feeder assembly of the present invention.

As best shown in FIG. 18, and to better facilitate the selective and slidable engagement of the locking tabs 424 of the excluder 400 with the apertures 218 of the outwardly extending feed pan tabs 216, the apertures 218 preferably include a first substantially rectangular region 222 adjacent with a second substantially rectangular region 224 having a width less than the width of the first rectangular region 222 As can be seen in FIGS. 18 and 29, to attach the excluder 400 to the feed pan 200, the locking tabs 424 of the excluder 400 are first inserted downwardly into the first rectangular region 222 of the apertures 218 Next the excluder 400 is rotated such that the locking tabs 424 are rotated into locked position and into the second rectangular region 224 such that the excluder 400 is selectively attached to the feed pan 200, Further, the rimmed wall 214 of the feed pan 200 also preferably includes an inner circumferential rim 226 upon which the excluder 400 rests when it is locked into position onto the feed pan 200

Figure 19:
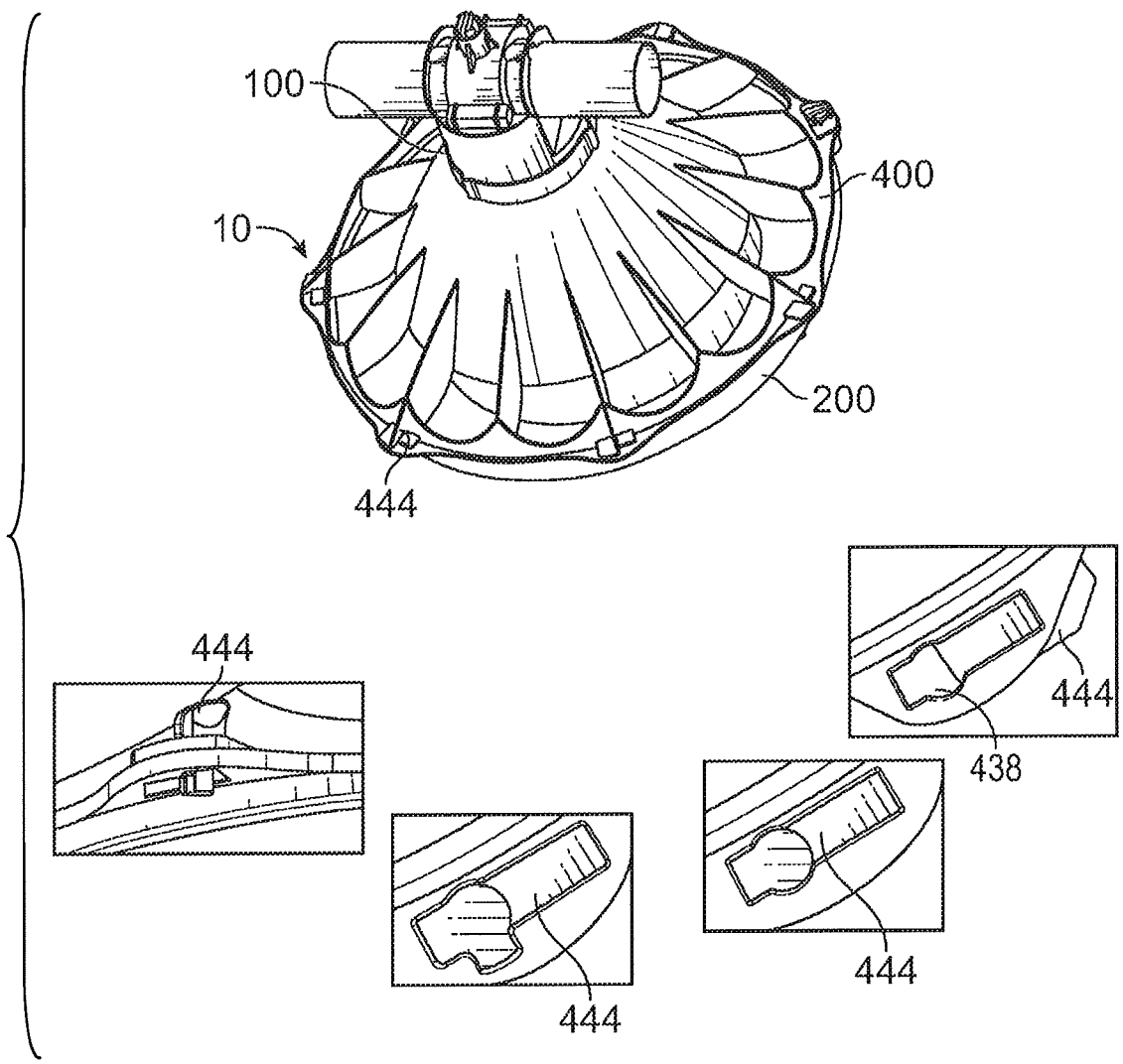
FIG. 19 is a series of views showing the insertion of the locking key into and through the locking projection aperture of the excluder component and the hole in the feed pan for receiving the key and the subsequent turning of the key into a locked position.

As best shown in FIGS. 16 and 19, at least one of the outwardly extending feed pan tabs 216 includes a hole 220 for receiving a locking key 444 When the hole 220 on the feed pan 200 is aligned with and under the corresponding locking projection aperture 438 of the excluder 400, the locking key 444 may be inserted through both the hole 220 and aperture 438 and subsequently turned so as to lock the excluder 400 and feed pan 200 together to complement the locking tab 424 arrangement described above As shown best in FIGS. 30 and 33-39, the pan feeder system 10 of the present invention also preferably comprises a slidable feed shut-off component 500 The feed shut-off component 500 preferably comprises a curved top surface 502 adapted to seat a portion of a feed tube 506 having a feed dispensing opening 507 on the underside thereof The feed shut-off component 500 also preferably includes a curved bottom surface adapted to be seated in the feed tube receiving recess 120 of the cone 100 such that when installed the slidable feed shut-off component is slidably disposed between the cone 100 and the feed tube 506

In order to limit the range of slidability, the feed shut-off component 500 preferably also includes a slot 510 for receiving a tab 508 on the feed tube 506 To allow for the selective admission of feed into the feed pan assembly 10, the feed shut-off component 500 further includes a feed flow aperture 504 that may be slid into and out of alignment and engagement with the feed dispensing opening 507 (see FIG. 30) on the underside of the feed tube 506 The feed shut-off component 500 also preferably includes one or more transverse ribs 514 disposed on the lower surface thereof Further, the feed shut-off component preferably includes a pair of downwardly extending end portions 512 that extend downwardly from opposite distal ends of the feed shut-off component 500. These end portions 512 may be engaged by a user to slide the feed shut-off component 500 into an appropriate position as desired Specifically, and as shown in FIG. 37, when the feed shut-off component 500 is slid between the feed tube 506 and feed tube receiving recess 120 of the cone 100 so that the feed dispensing opening 507 of the feed tube 506 is aligned above the feed flow aperture 504 of the feed shut-off component 500, the feed shut-off component is in an "open" position 516 that allows for the free flow of feed from the tube 508 and into the pan feeder 10

Figure 38:
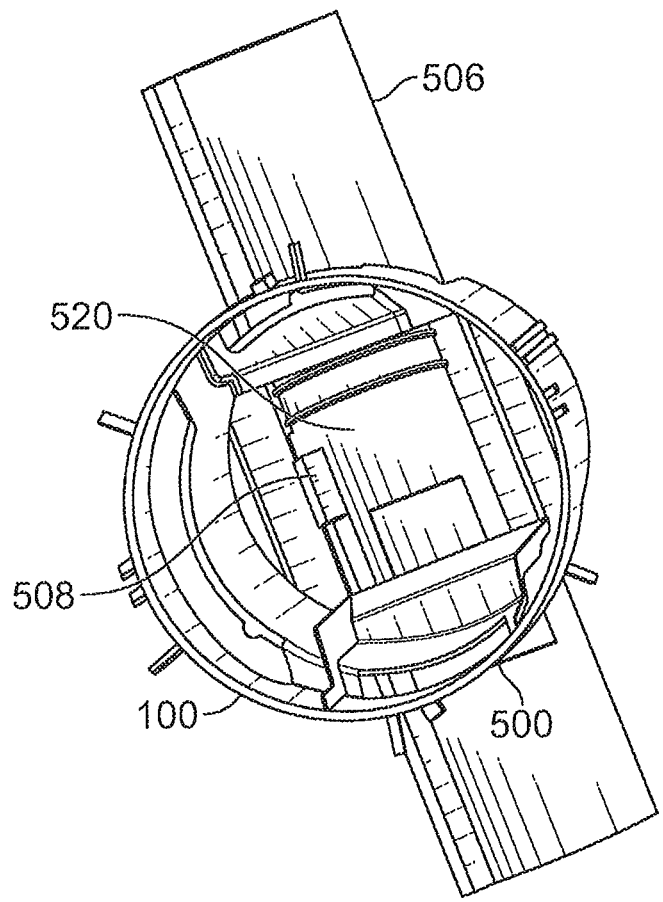
FIG. 38 is a bottom perspective view of the cone an feed shut-off components of the pan feeder assembly of the present invention showing the feed shut-off component in a closed position.

Further, and as shown in FIG. 38, when the feed shut-off component 500 is slid between the feed tube 506 and feed tube receiving recess 120 of the cone 100 so that the feed dispensing opening 507 of the feed tube 506 is not adjacent with any part of the feed flow aperture 504 of the feed shut-off component 500, the feed shut-off component 500 is in a "closed" position 520 that allows for no flow of feed from the tube 508 and into the pan feeder 10

Figure 32:
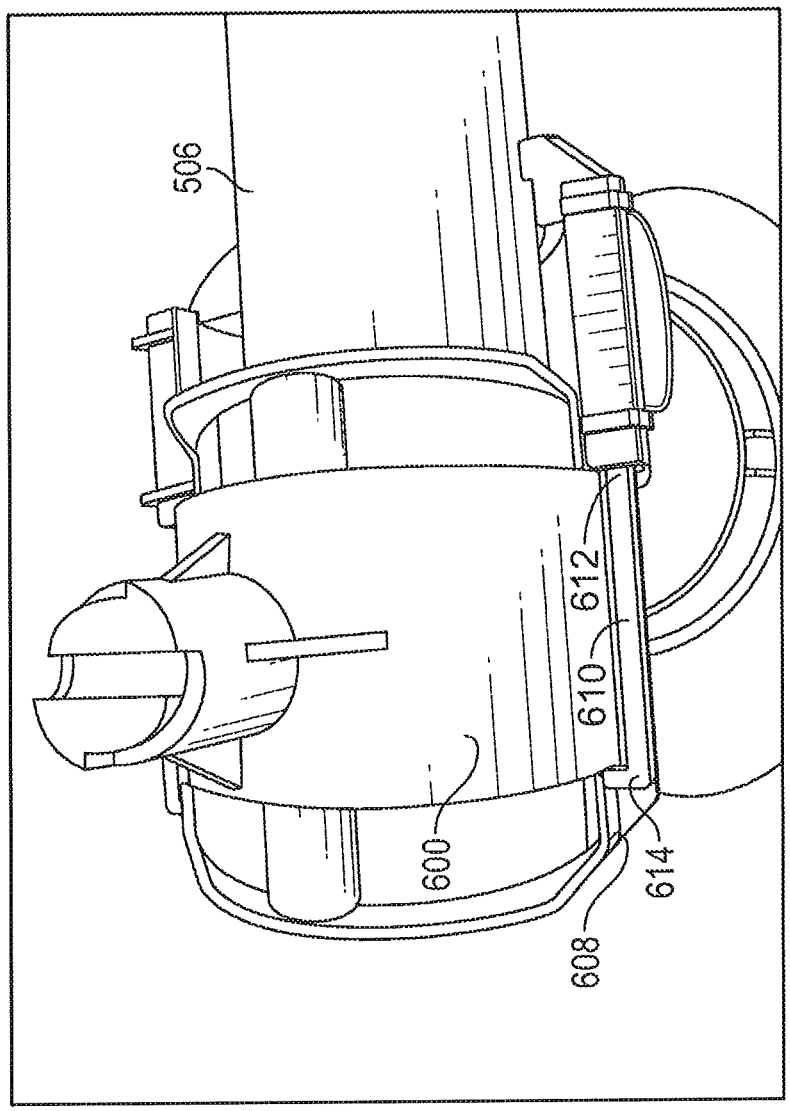
FIG. 32 is a top perspective view showing the cap component of the pan feeder assembly of the present invention being slidably locked into position on the cone portion.
Figure 36:
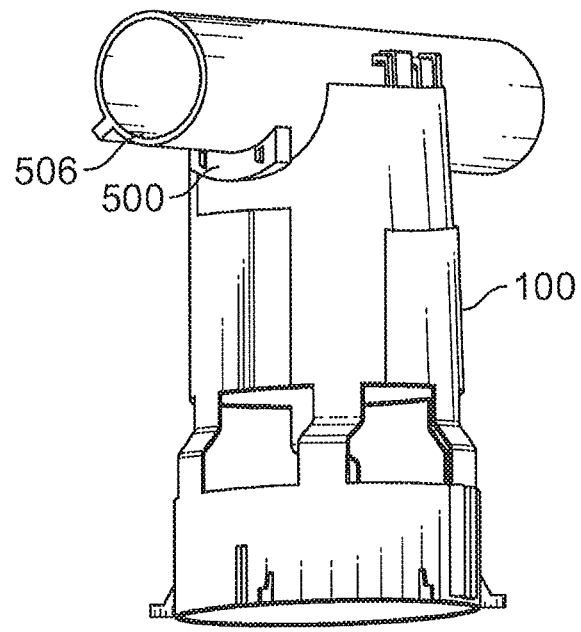
FIG. 36 is a side perspective view showing the feed shut-off component and feed tube installed in the cone component of the pan feeder assembly of the present invention.
Figure 37:
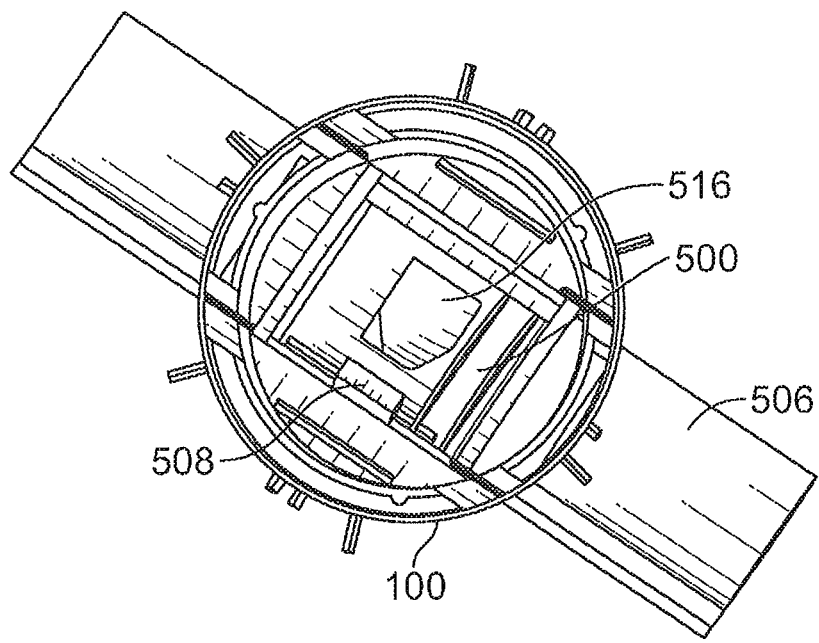
FIG. 37 is a bottom perspective view of the cone an feed shut-off components of the pan feeder assembly of the present invention showing the feed shut-off component in an open position.
Figure 39:
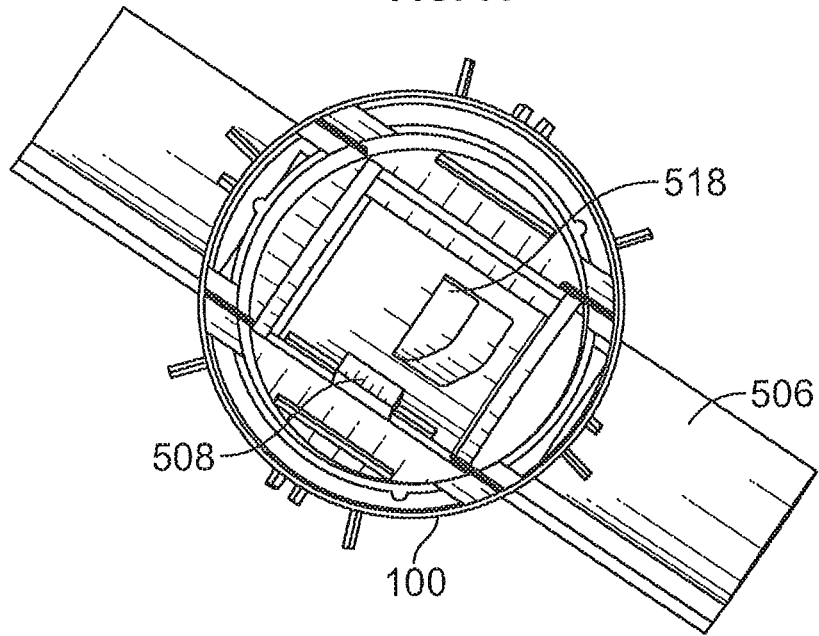
FIG. 39 is a bottom perspective view of the cone an feed shut-off components of the pan feeder assembly of the present invention showing the feed shut-off component in a half opened position.
Figure 40:
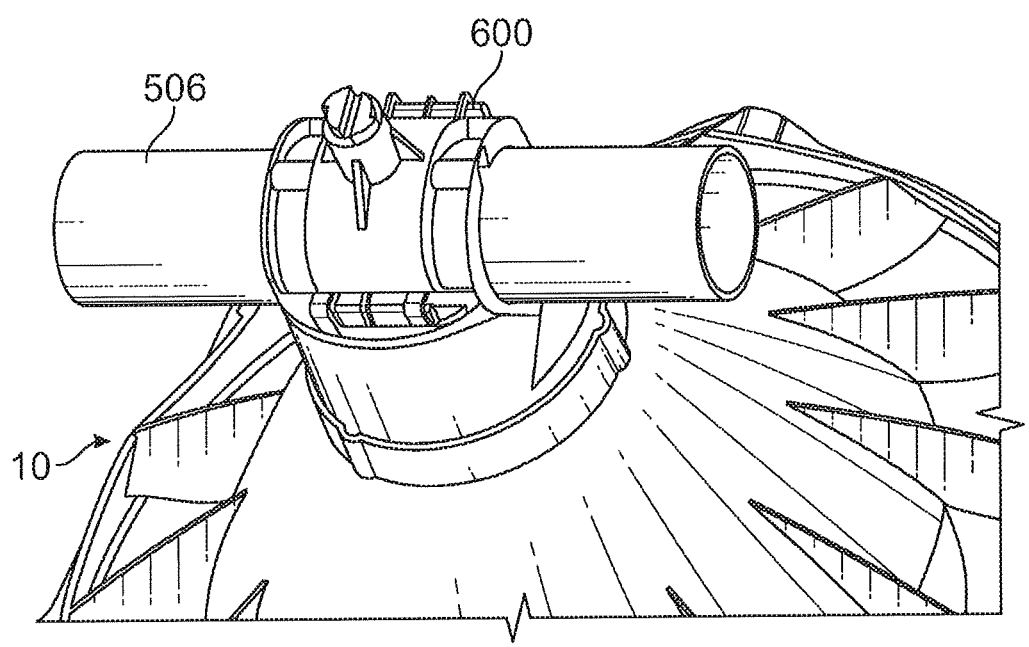
FIG. 40 is a partial view of a segment of the pan feeder assembly of the present invention showing a first embodiment of the cap component.
Figure 41:
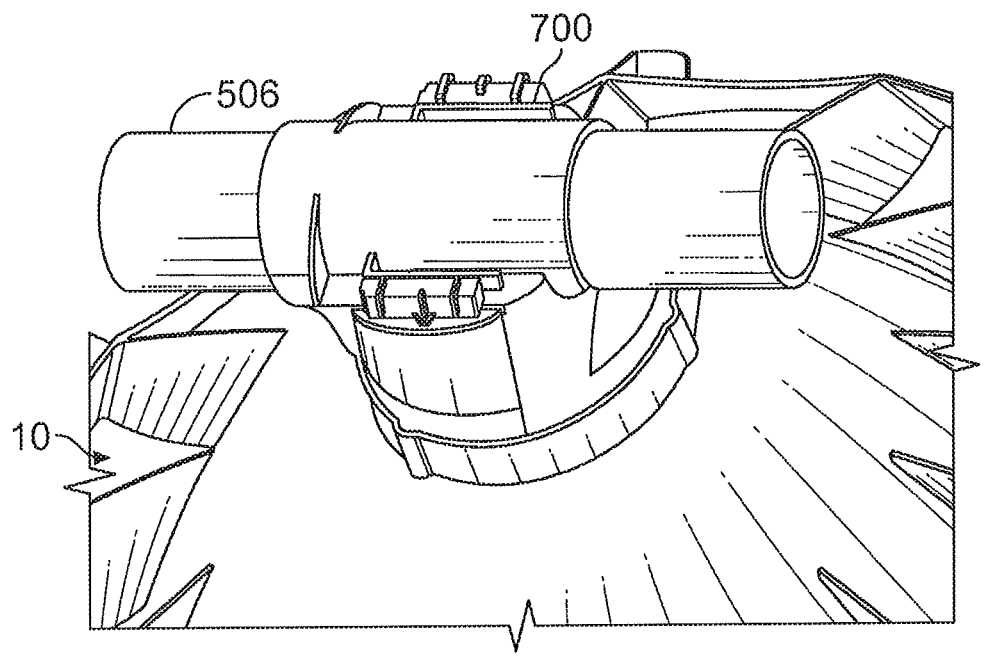
FIG. 41 is a partial view of a segment of the pan feeder assembly of the present invention showing an alternative embodiment of the cap component.
Figure 42:
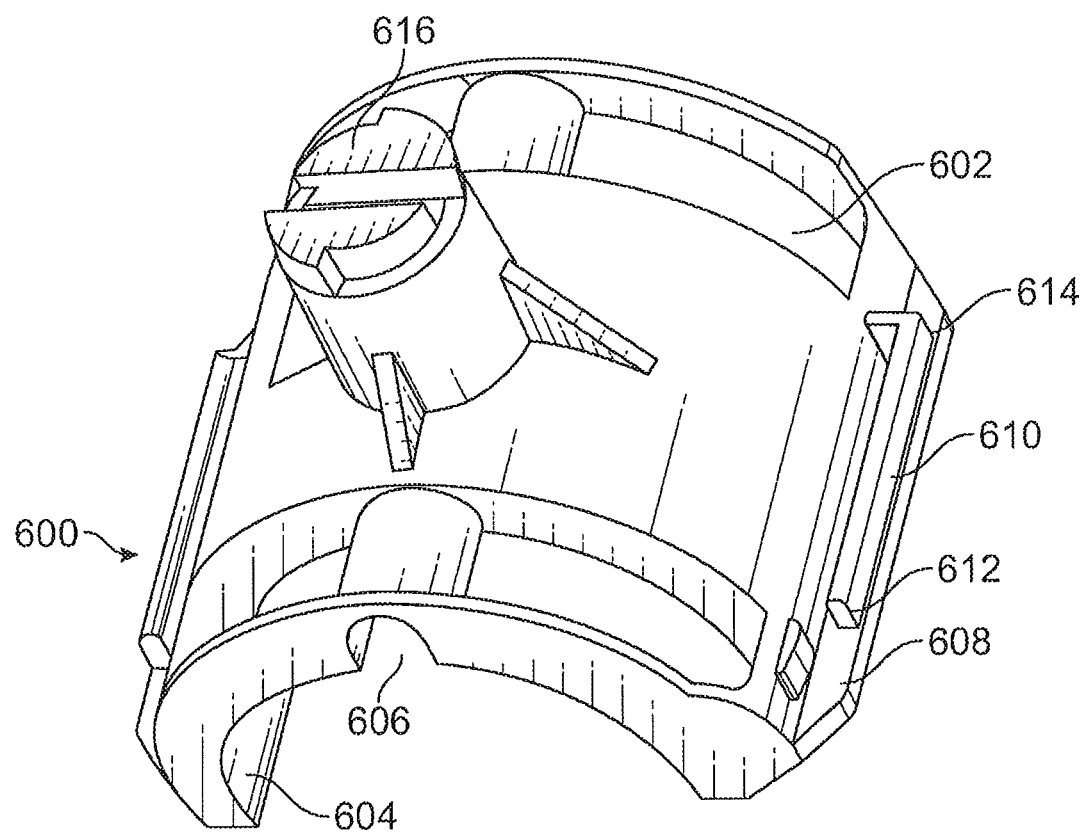
FIG. 42 is a top perspective view of a first embodiment of the cap component of the pan feeder assembly of the present invention

Finally, and as shown in FIG. 39, when the feed shut-off component 500 is slid between the feed tube 506 and feed tube receiving recess 120 of the cone 100 so that the feed dispensing opening 507 of the feed tube 506 is partially aligned above the feed flow aperture 504 of the feed shut-off component 500, the feed shut-off component 500 is in a "partially open" position 518 that allows for a restricted flow of feed from the tube 508 and into the pan feeder 10 As shown in FIGS. 37-39, the transverse ribs may be used to visually or in a tactile manner to assist with the indexing of the feed shut-off component 500 among the open 516, closed 520, and partially opened 518 positions As best shown in FIGS. 32 and 40-42, the feed pan assembly 10 of the present invention also includes a cap component 600 adapted to be selectively attached to the upper segment 102 of the cone 100 so as to hold the feed tube 506 therebetween As best shown in FIG. 42, the cap 600 has a top surface 602 and a bottom surface 604 The bottom surface 604 is preferably substantially curved such that it is adapted to be seated atop a portion of the feed tube 506 The bottom surface 604 may also have a longitudinally disposed groove 606 therein to provide access and space for other components as needed The cap 600 also preferably includes a pair of oppositely opposed projections 608 that extend outwardly from and substantially perpendicularly with opposite lower edges of the cap 600. In order to facilitate the connection of the cap 600 to the cone 100, each oppositely opposed projection 608 further includes a longitudinal stop 610 thereon as best shown in FIG. 32 To facilitate the slidable engagement of the cap 600 onto the cone 100, each longitudinal stop 610 includes an open first end 612 and a closed second end 614 such that each longitudinal stop 610 may be selectively and slidably received into and within a corresponding upstanding cap receiving projection 122 of the cone 100 so as to selectively link the cap 600 with the cone 100

The cap 600 may also include an upstanding portion 616 that advantageously discourages birds from roosting thereon. An alternate embodiment of the cap 700, a colony cap for colony feeders, is shown in FIG. 41 that also includes the linking features of the cap 600 adapted for floor feeders as described above Although described above in connection with each of the various parts of the feed pan assembly 10, reference is again made to FIGS. 28-32 that show the preferred steps of assembling the various components of the feed pan assembly 10 together First, FIG. 28 shows the insertion of the skirt 300 over the cone 100. Next, FIG. 29 depicts how the excluder 400 is aligned and slid downwardly onto the cone 100 as well as how the locking tabs 424 are inserted and positioned into the apertures 218 of the feed pan 200 (see also FIG. 18) The key 444 is also shown inserted through the locking projection aperture 438 of the excluder 400 and the hole 220 on the feed pan (see also FIG. 19)

Figure 22:
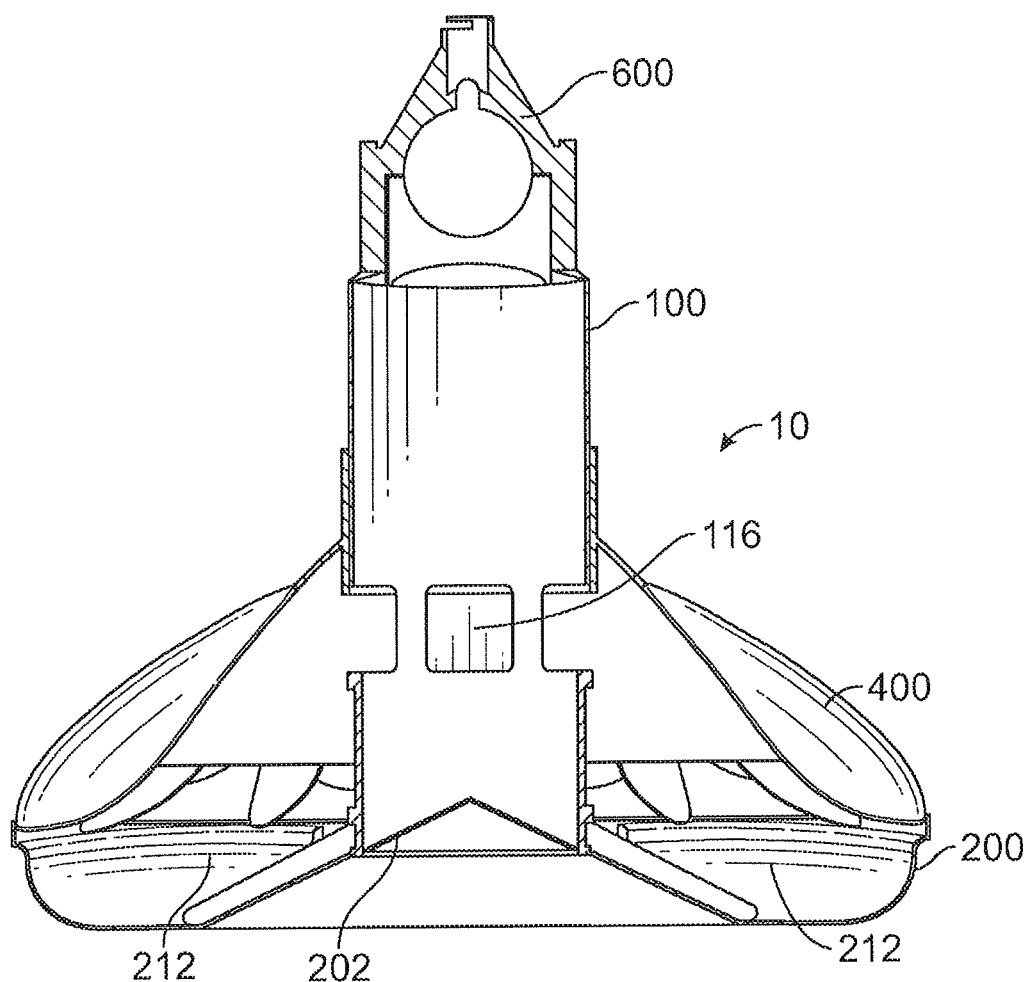
FIG. 22 is a cross sectional side view of the pan feeder assembly of the present invention.

FIGS. 30 and 31 again show how the feed shut-off component 500 is installed between the feed tube 506 and the cone 100 Finally, FIG. 32 summarizes again how the cap component 600 is slidably attached to the cone 100 once the feed tube 506 and feed shut-off component 500 are in position. FIG. 22 is a cross-sectional cutaway view that shows in greater detail the relative position of the various components of the feed pan assembly 10 when the cone 100 is resting and at its lowest downward position atop the feed pan 200

Figure 23:
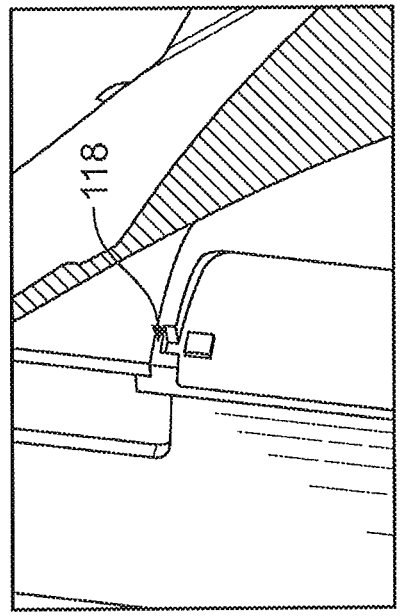
FIG. 23 is a pair of views showing 1) a top pair of cross sectional views showing the pan feeder assembly in a first position (top left) and the stop tabs of the cone portion engaging slots in the excluder that correspond with the first position (top right) and 2) a bottom pair of cross sectional views showing the pan feeder assembly in a third position (bottom left) and the stop tabs of the cone portion engaging slots in the excluder that correspond with the third position (bottom right)
Figure 23:
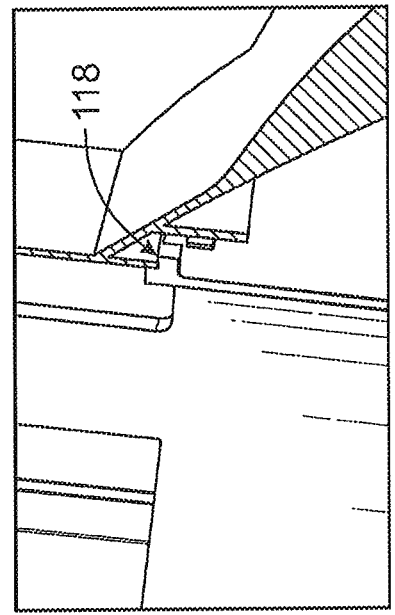
Figure 23:
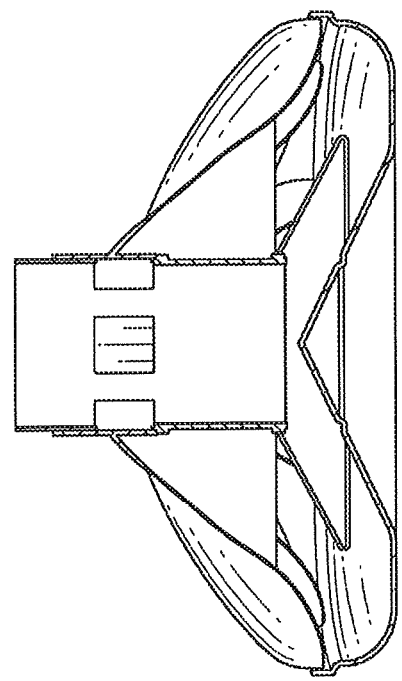
Figure 23:
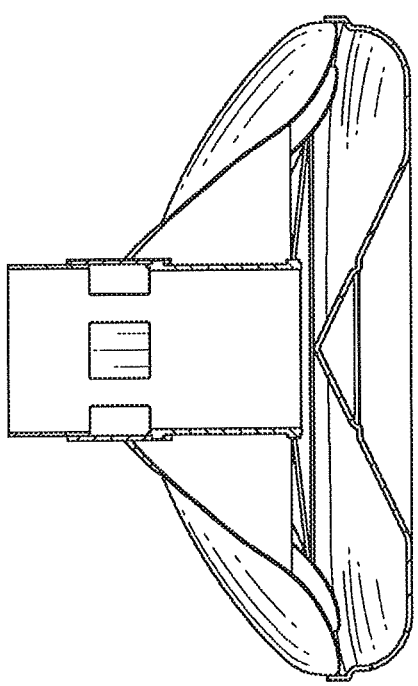
Figure 24:
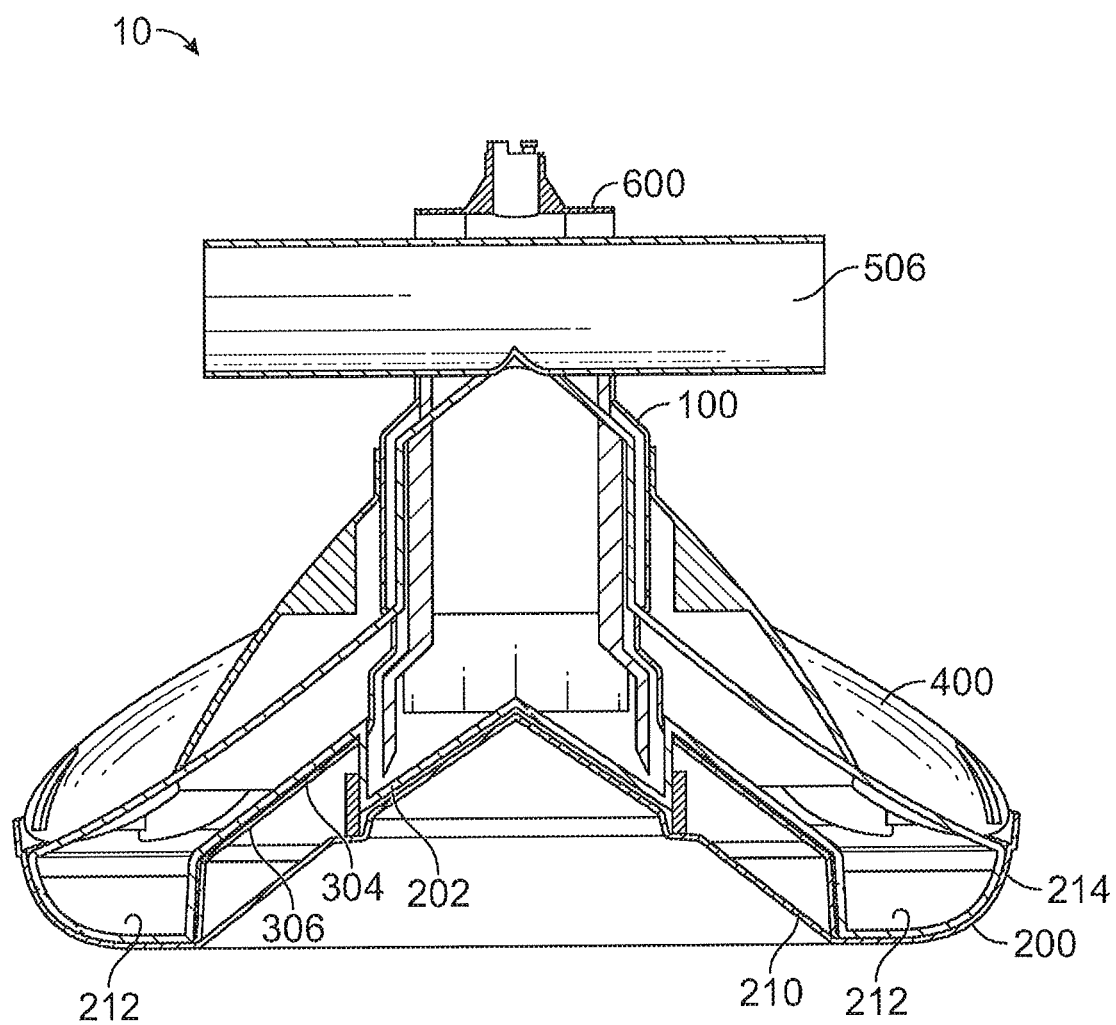
FIG. 24 is a cross sectional view of the pan feeder assembly of the present invention showing the cone in a lowered position and at rest on the feed pan component.

With reference to FIGS. 23-27, additional detail will be discussed regarding the adjustable feed levels of the feed pan assembly 10 of the present invention Once again, this adjustability is achieved through the selective engagement of the pair of stop tabs 118 with a predetermined pair of notches 416 Although it is possible to have greater or fewer pairs of notches 416, for exemplary purposes, the feed pan assembly 10 is shown and described as having 3 pairs of oppositely opposed notches 416 that result in a feed pan assembly 10 that has three feed heights to choose from depending on the age and population of the poultry being fed at a given time First, and as shown in FIG. 24, when the cone 100 is resting on the pan 200 when the feeder system 10 is resting on the floor As can be seen in the highlighted region, some feed is distributed even when in this resting position As will be seen in subsequent figures and feed level positions, feed level is set by how far above the flood window shut-off the cone 100 can travel when it is slid upwardly and away from the pan 200 and as dictated by which pair of notches 416 are engaged by the stop tabs 118 As seen in FIGS. 23-27, when the cone 100 is slid upwardly from the pan 200 feed is able to exit the bottom of the cone and is distributed throughout the pan in part by deflection from the various features of the pan 200

Figure 25:
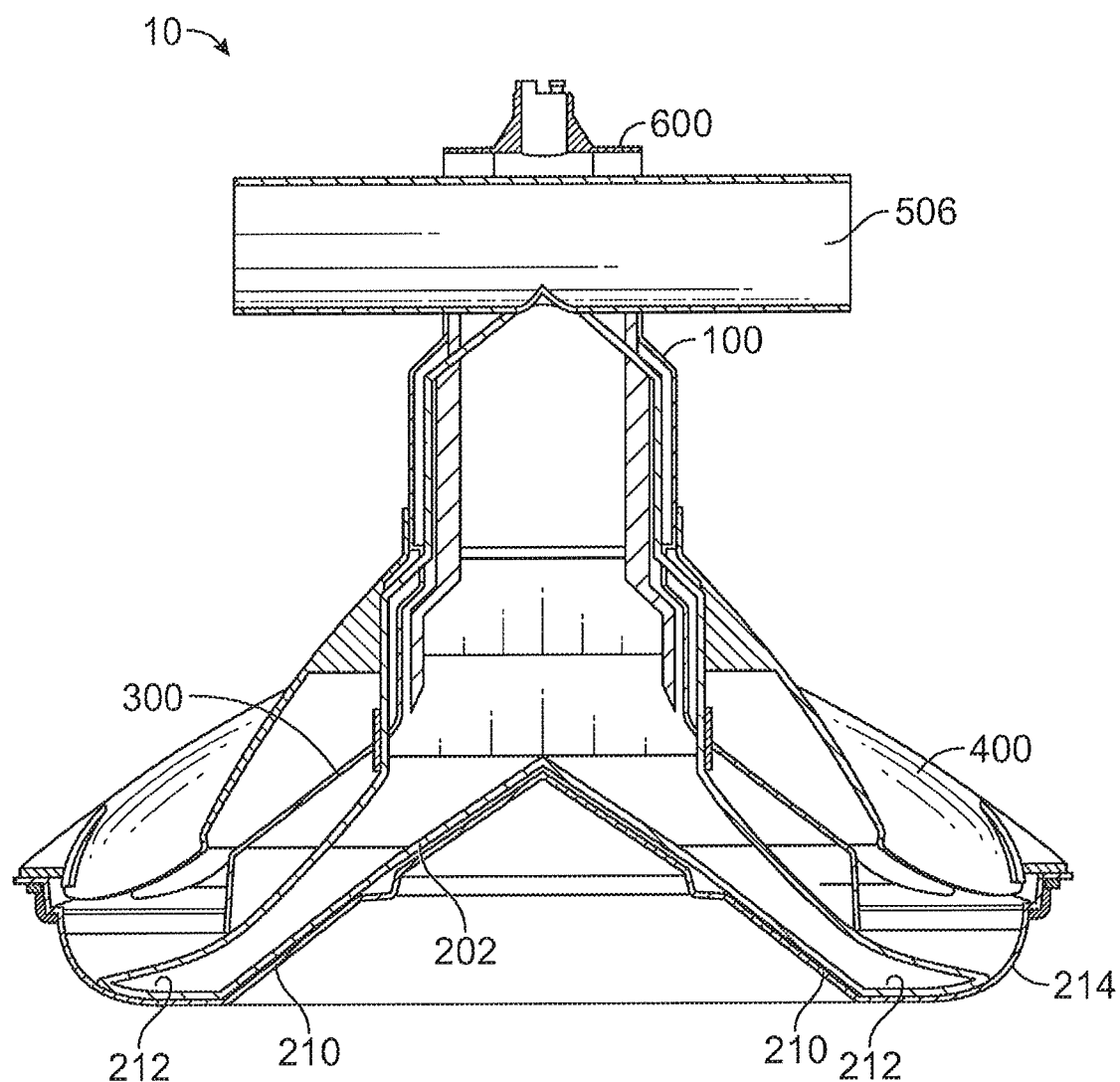
FIG. 25 is a cross sectional view of the pan feeder assembly of the present invention showing the cone raised upwardly from the feed pan and engaged in the slots of the excluder that correspond with the first feed position.
Figure 26:
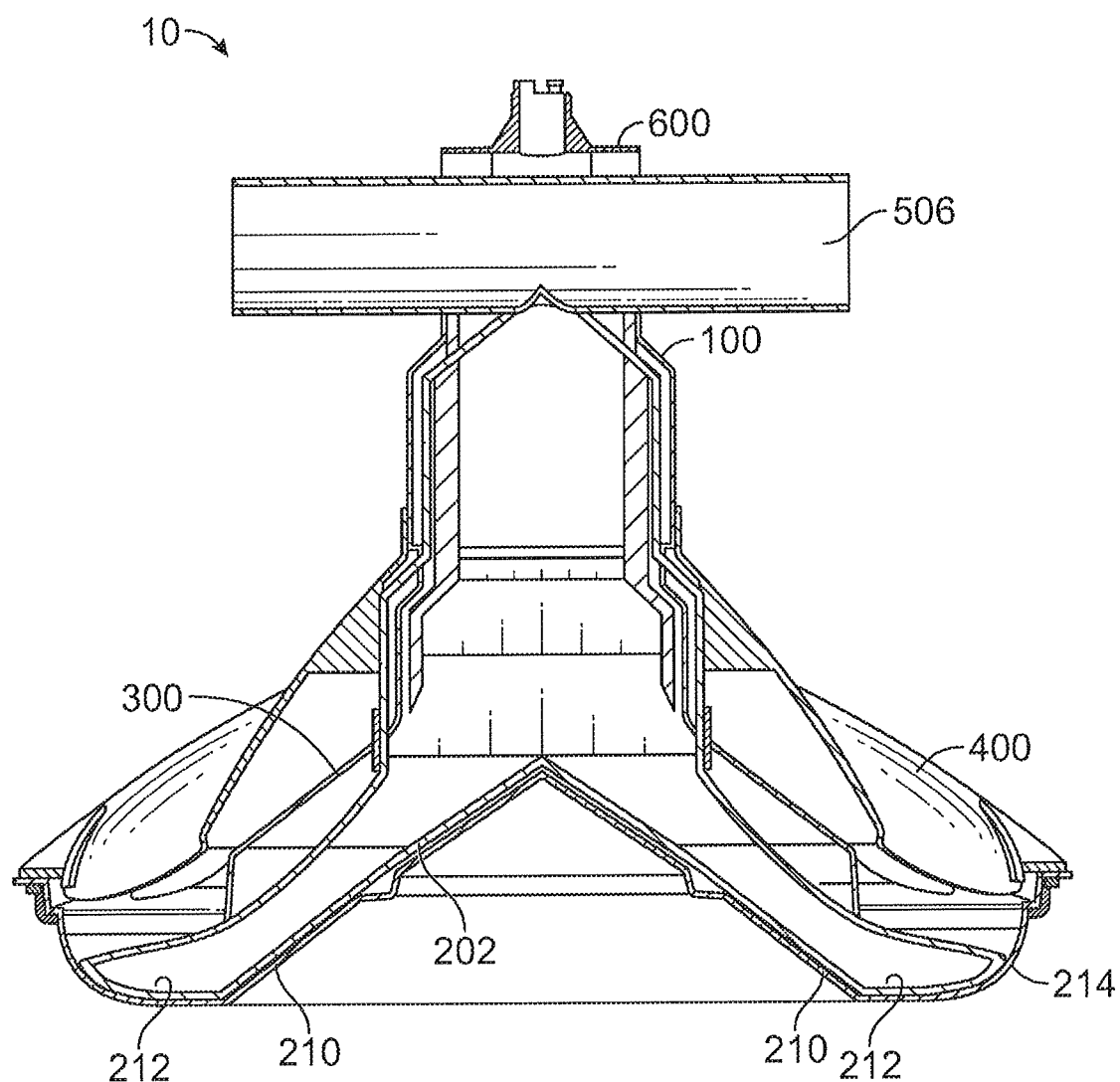
FIG. 26 is a cross sectional view of the pan feeder assembly of the present invention showing the cone raised upwardly from the feed pan and engaged in the slots of the excluder that correspond with the second feed position.
Figure 27:
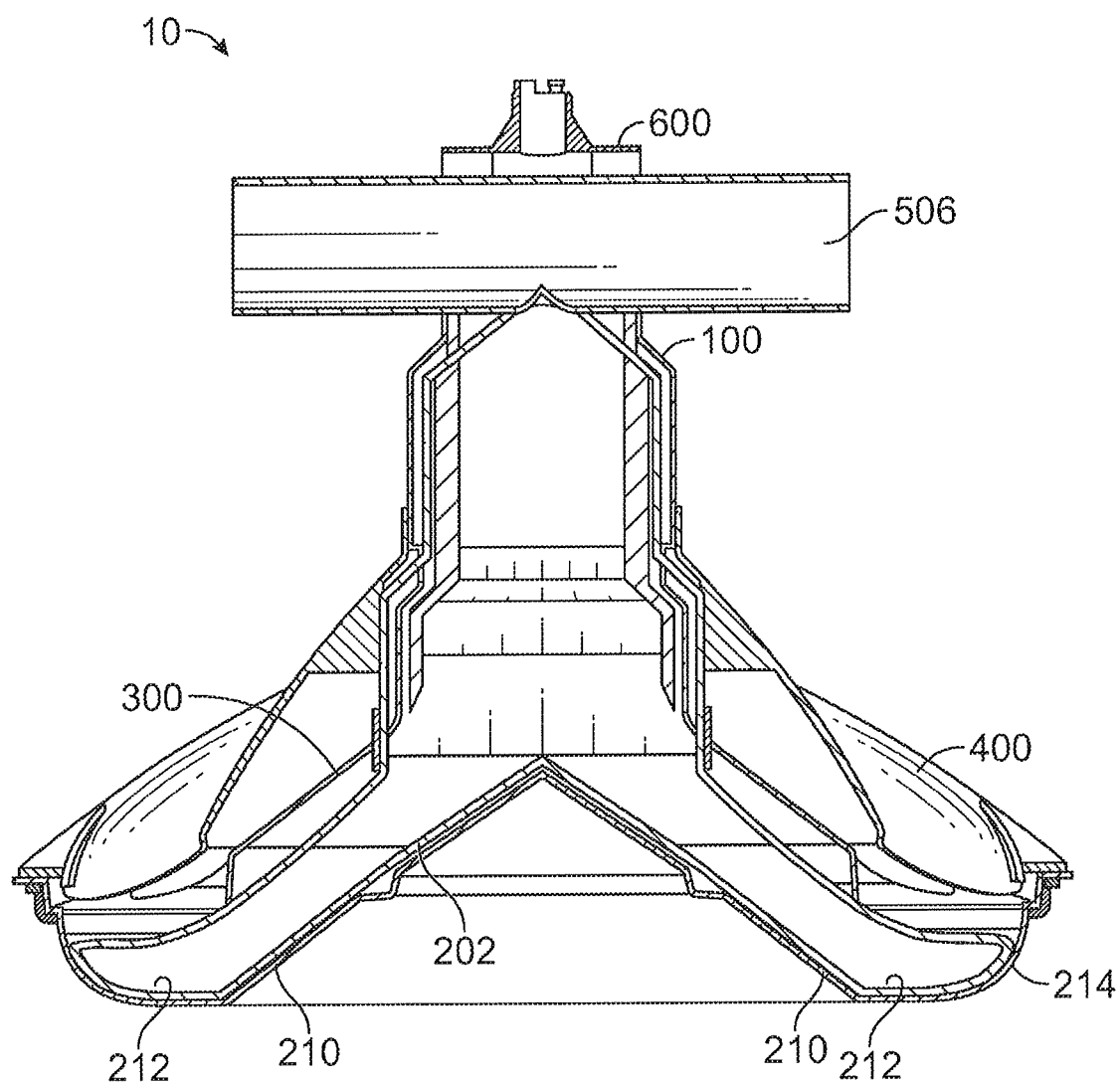
FIG. 27 is a cross sectional view of the pan feeder assembly of the present invention showing the cone raised upwardly from the feed pan and engaged in the slots of the excluder that correspond with the third feed position.

For example, in the top two images of FIG. 22, and in FIG. 25, a first feeding position is shown when the notches 416 of the lowest depth are selected and seated in the stop tabs 118 As can be seen in FIG. 25, and as an example only, the first feed position may correspond to a feed depth in the pan 200 of about 0 75 inches Similarly, with reference to FIG. 26, an intermediate feed level or feed level 2 may be achieved when the stops 118 engage the notches 416 having an intermediate depth, in this example a depth of 1 0 inch Finally, and as is shown in the lower 2 images of FIG. 23 and in FIG. 27 a relatively high level of feed, in this example a depth of 1 25 inches, may be achieved by selecting the notches 416 with the greatest depth for engagement with the stops 118

Figure 3:
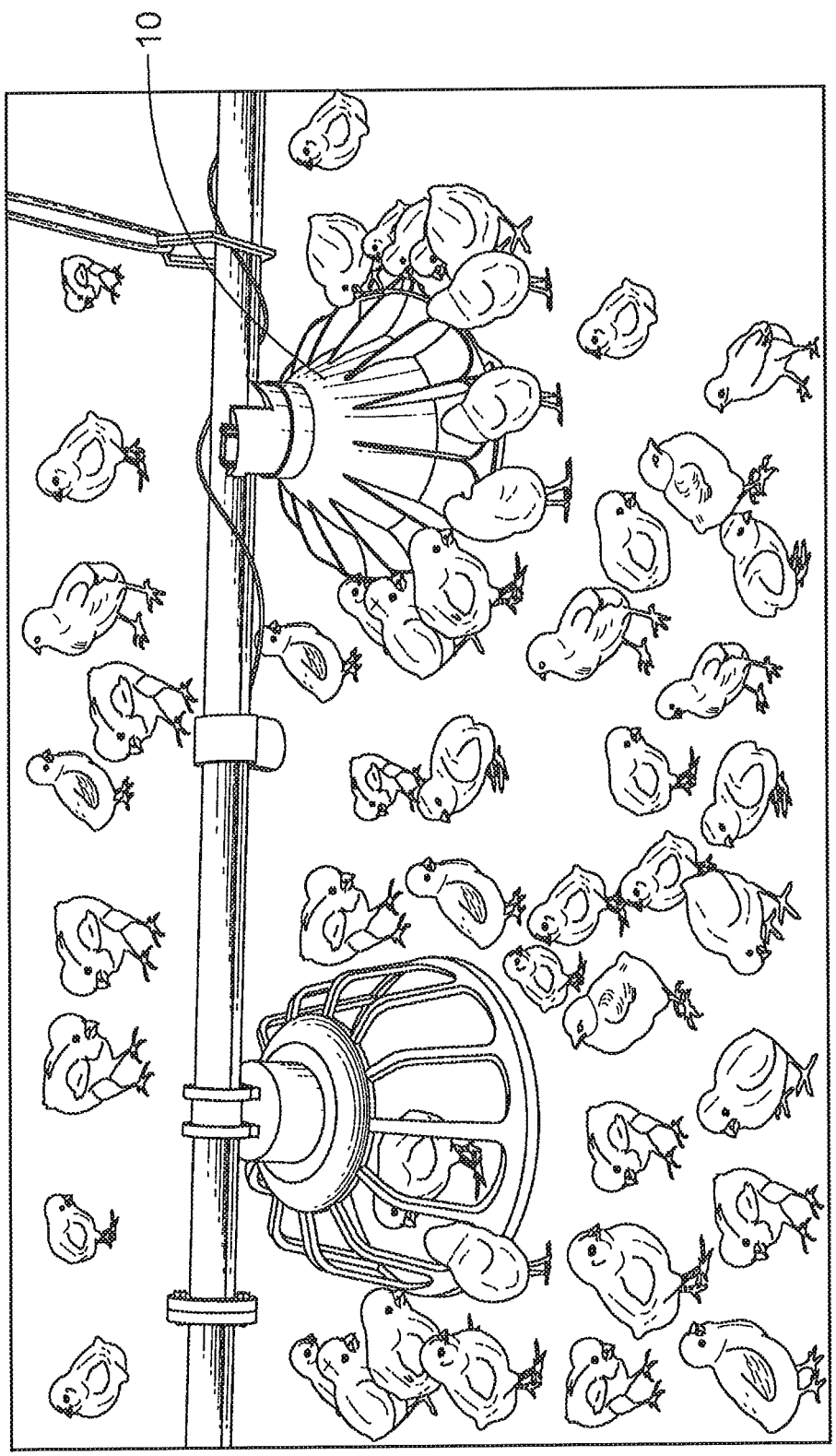
FIG. 3 shows a side-by-side comparison view of chicks feeding from one prior art feeder pan assembly and the pan feeder assembly of the present invention.
Figure 4:
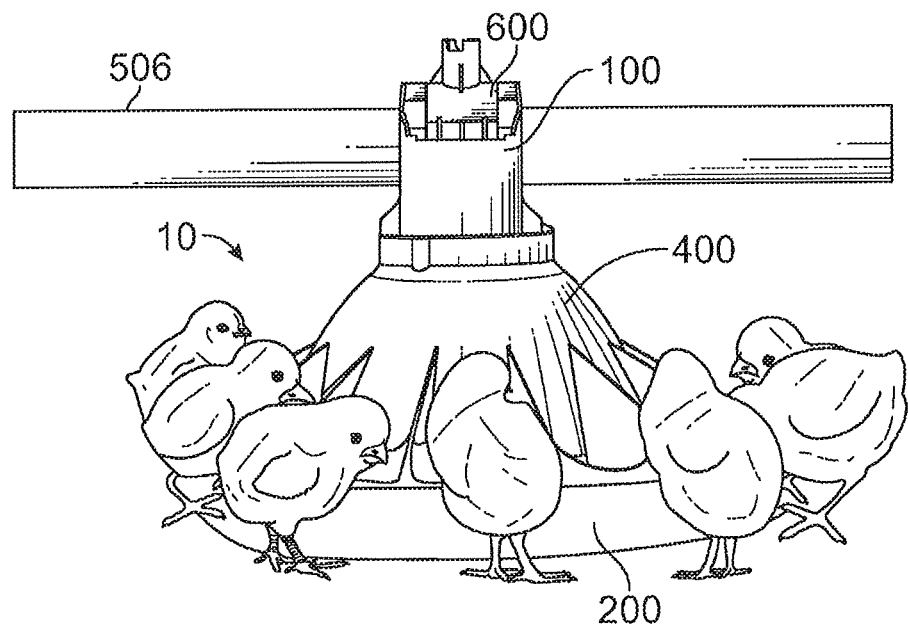
FIG. 4 is a side elevational view of chicks feeding from the pan feeder assembly of the present invention.

As can best be seen in the highlighted regions in FIGS. 24-27, the various features and geometries of the components of the feed pan system 10 allow for more controlled and more evenly distributed feed as desired For example, when the cone 100 is slid upwardly, the relatively high height of the flood windows 116 above the skirt 300, the conical member top surface 204 of the feed pan 200, and the sloped area 210 of the pan 200 allow the feed to contact these features with greater velocity and, as a result, spread out farther to the feed receiving areas 212 of the pan 200 upon such contact Now that the composition and features of the feed pan assembly 10 have been described, it should be appreciated that there are numerous advantageous features and benefits of the present invention For example, and as shown with the left prior art feeder in FIG. 3, it is common with prior art feeding systems for chicks or young poultry to enter into the feed pan and soil the feed or otherwise prevent access to the feed by other chicks. In contrast, many features of the present invention advantageously prevent chicks from standing on or in the pan feeder system 10 as shown on the right in FIG. 3 and FIG. 4 where all chicks are feeding from outside the feeder system 10 of the present invention As an example of the preventative features of the present invention, the flood control member 406 of the excluder 400 minimized the size and openness of the feed chambers 408 thus discouraging chicks from entering In addition, the curved upper edges 410 of the fins 402 also discourage birds from standing thereon Additionally, the fin extensions 432 discourage the birds from standing on or near the locking tabs 424 on the peripheral edge of the excluder 400. The low height of the middle portion of the arcuate wall segments 440 of the scalloped peripheral edge 404 of the excluder 400 allow for chicks to immediately begin feeding from the feed pan system 10 without requiring supplemental feeders or giving the chicks reason to enter the pan 200 Further, when the highest feed level is selected, the pan 200 floods with feed of a sufficiently increased depth for easy access by the youngest of poultry.

The feed pan assembly 10 can be used in connection with devices, such as swing-down devices that are well-known in the art, that allow the assembly 10 to be readily cleaned and dried The various components are easily assembled and disassembled and have relatively few cracks and crevices that facilitate an easier cleaning process as there are no corners or pockets to trap feed and no grills to work around While the invention has been represented in detail and described with reference to the drawings and description, this should be regarded as exemplary only and the invention is not limited to the embodiments described and different variants are possible.

The invention claimed is:

1. A poultry feeder assembly comprising:
   a feed pan comprising a cone receiving surface and a rimmed wall having an inner circumferential rim;
   an excluder connected to the feed pan, the excluder comprising:
     a cone receiving portion;
     a flood control member connected to and extending away from the cone receiving portion, wherein the flood control member has a top surface;
     a peripheral edge having an innermost side; and
     a plurality of fins each having a lower edge;
     wherein each of the plurality of fins is radially disposed on the top surface of the flood control member along a portion of the lower edge of each of the plurality of fins, wherein each of the plurality of fins extends to and is connected to the peripheral edge, and wherein the peripheral edge is configured to connect to the inner circumferential rim of the feed pan;
   a cone member comprising:
     an upper cone segment; and
     a lower cone segment having a bottom peripheral edge;
     wherein the upper cone segment and the lower cone segment are connected together by a plurality of struts, wherein the upper cone segment, the plurality of struts, and lower cone segment define a plurality of flood windows, wherein the bottom peripheral edge of the lower cone segment is configured to connect with the cone receiving surface of the feed pan, and wherein the upper cone segment is configured to be received by the cone receiving portion of the excluder; and
   a skirt having an annular inner edge defining an opening configured to receive the cone member and connect to the lower cone segment of the cone member, and wherein when the feeder assembly is assembled for normal operation the skirt is disposed between the excluder and the feed pan.

2. The poultry feeder assembly of claim 1, wherein each of the plurality of fins comprises a curved upper edge.

3. The poultry feeder assembly of claim 2, wherein each of the plurality of fins is disposed equidistantly from each immediately adjacent fin on the excluder.

4. The poultry feeder assembly of claim 1, further comprising a plurality of feed chambers, each of the plurality of feed chambers being defined by at least two of the plurality of fins, the peripheral edge of the excluder, and a feed receiving area of the feed pan.

5. The poultry feeder assembly of claim 1, wherein a portion of the lower edge of each of the plurality of fins is detached from the top surface of the flood control member.

6. The poultry feeder assembly of claim 1, wherein at least one of the plurality of fins further comprises a fin extension.

7. The poultry feeder assembly of claim 1, wherein the peripheral edge of the excluder is scalloped.

8. The poultry feeder assembly of claim 1, wherein the cone receiving portion further comprises an upwardly disposed annular wall and a downwardly disposed annular lip, and wherein the annular wall and annular lip respectfully extend away from the top surface of the flood control member in opposite directions.

9. The poultry feeder assembly of claim 1, wherein each of the plurality of flood windows is defined by the upper cone segment, at least two of the plurality of struts, and the lower cone segment.

10. The poultry feeder assembly of claim 1, wherein the assembly is adjustable to a plurality of feed levels.

11. The poultry feeder assembly of claim 10, wherein the cone member further comprises a stop tab, the cone receiving portion further comprises an annular wall and an annular lip, and wherein the annular lip further comprises a plurality of notches each having a depth and each being complementary to the stop tab.

12. The poultry feeder assembly of claim 11, wherein at least one of the plurality of notches has a first depth, wherein at least one of the plurality of notches has a second depth, wherein at least one of the plurality of notches has a third depth.

13. The poultry feeder assembly of claim 11, wherein the flood windows are selectively substantially opened or selectively substantially closed by sliding the cone member towards or away from the feed pan.

14. The poultry feeder assembly of claim 12, wherein engagement of the stop tab with the notch having a first depth corresponds to a first feed level, wherein engagement of the stop tab with the notch having a second depth corresponds to a second feed level, and wherein engagement of the stop tab with the notch having third depth corresponds to a third feed level.

15. The poultry feeder assembly of claim 1, wherein the upper cone segment has a smaller diameter than the lower cone segment.

16. The poultry feeder assembly of claim 15, wherein each of the plurality of struts comprises an upper strut portion, lower strut portion, and sloped middle portion that extends downwardly and outwardly from the upper strut portion to the lower strut portion.

17. The poultry feeder assembly of claim 1, wherein the lower cone segment further comprises one or more skirt supports configured to engage a lower surface of the skirt and support the skirt thereon.

18. The poultry feeder assembly of claim 1, wherein the skirt further comprises an annular sloped surface that extends downwardly away from the lower cone segment.

19. The poultry feeder assembly of claim 18, wherein the skirt further comprises an annular peripheral wall.

20. The poultry feeder assembly of claim 1, wherein the feed pan further comprises a centrally disposed conical member.

* * * * *